US011789825B2

(12) United States Patent
Puvvada et al.

(10) Patent No.: US 11,789,825 B2
(45) Date of Patent: Oct. 17, 2023

(54) HASHING INFORMATION OF AN INPUT/OUTPUT (I/O) REQUEST AGAINST A PLURALITY OF GATEWAY NODES

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ashish Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 17/102,063

(22) Filed: Nov. 23, 2020

(65) Prior Publication Data

US 2022/0164258 A1 May 26, 2022

(51) Int. Cl.
*G06F 11/14* (2006.01)
*G06F 11/30* (2006.01)
*G06F 11/07* (2006.01)

(52) U.S. Cl.
CPC ...... *G06F 11/1464* (2013.01); *G06F 11/0772* (2013.01); *G06F 11/1451* (2013.01); *G06F 11/1469* (2013.01); *G06F 11/3006* (2013.01); *G06F 11/3051* (2013.01)

(58) Field of Classification Search
CPC ............ G06F 11/1464; G06F 11/0772; G06F 11/1451; G06F 11/1469; G06F 11/3006; G06F 11/3051
See application file for complete search history.

(56) References Cited

U.S. PATENT DOCUMENTS

| 8,516,159 | B2 | 8/2013 | Ananthanarayanan et al. |
| 9,223,788 | B2* | 12/2015 | Ranade ............... G06F 11/0751 |
| 10,938,892 | B1* | 3/2021 | Puvvada ................ H04L 67/06 |
| 2012/0011176 | A1 | 1/2012 | Aizman |
| 2014/0074787 | A1* | 3/2014 | Berman ............. G06F 11/1469 |
| | | | 707/639 |
| 2018/0189304 | A1 | 7/2018 | Bhagwat et al. |
| 2018/0189309 | A1 | 7/2018 | Bhagwat et al. |

* cited by examiner

*Primary Examiner* — Tammara R Peyton
(74) *Attorney, Agent, or Firm* — Zilka-Kotab, P.C.

(57) ABSTRACT

A computer-implemented method according to one embodiment includes receiving, on a first cluster site, a first I/O request to migrate a plurality of filesets from a second cluster site to the first cluster site. The first cluster site includes a plurality of gateway nodes. The method further includes identifying at least two of the gateway nodes having resources available to perform operations of the migration, and hashing information of a plurality of filesets against the identified gateway nodes. The information includes inode numbers of entities that are mounted during fulfillment of the first I/O request. Operations of the first I/O request are distributed to the identified gateway nodes based on the hashing, and the identified gateway nodes are instructed to fulfill the operations.

19 Claims, 10 Drawing Sheets

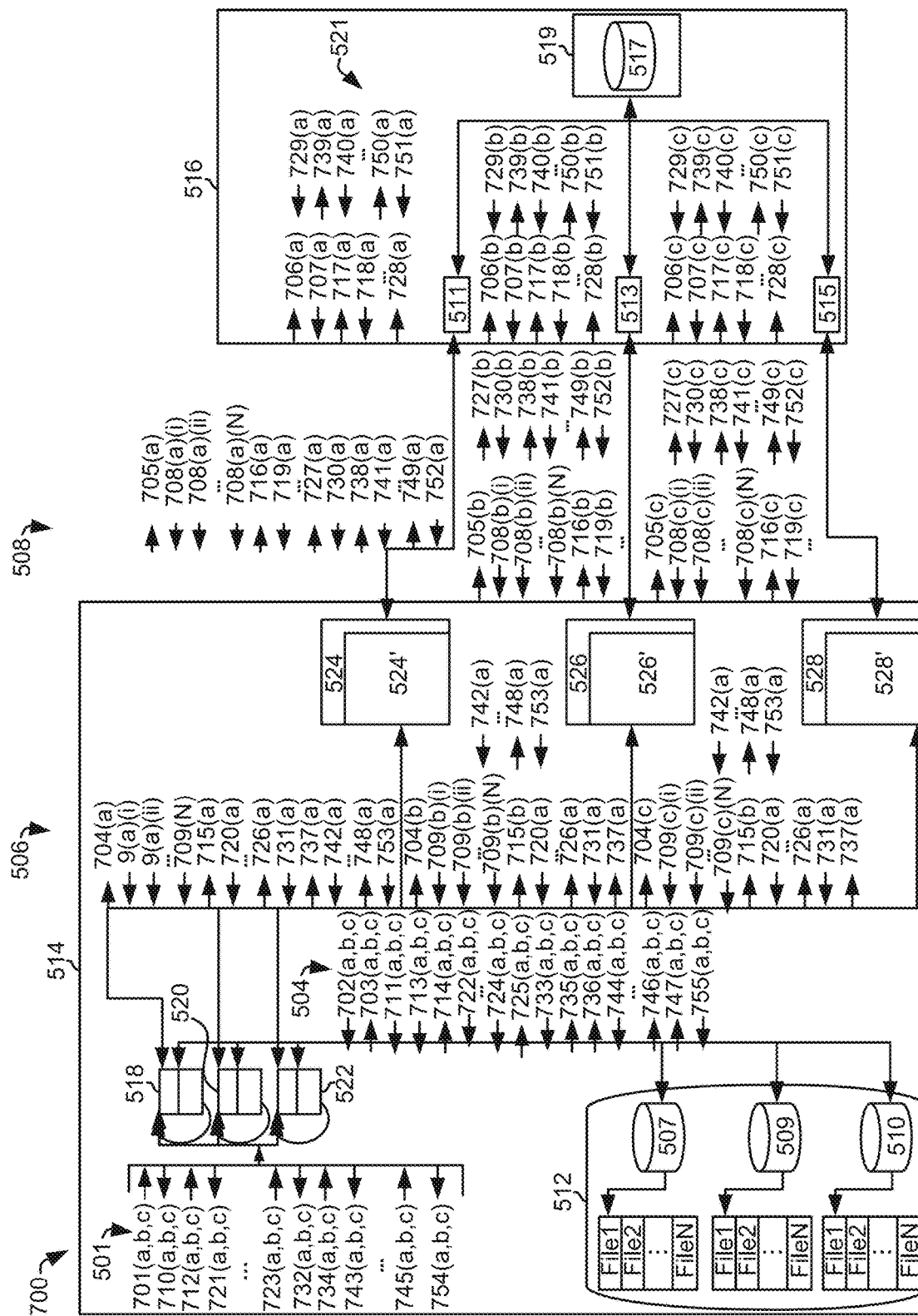

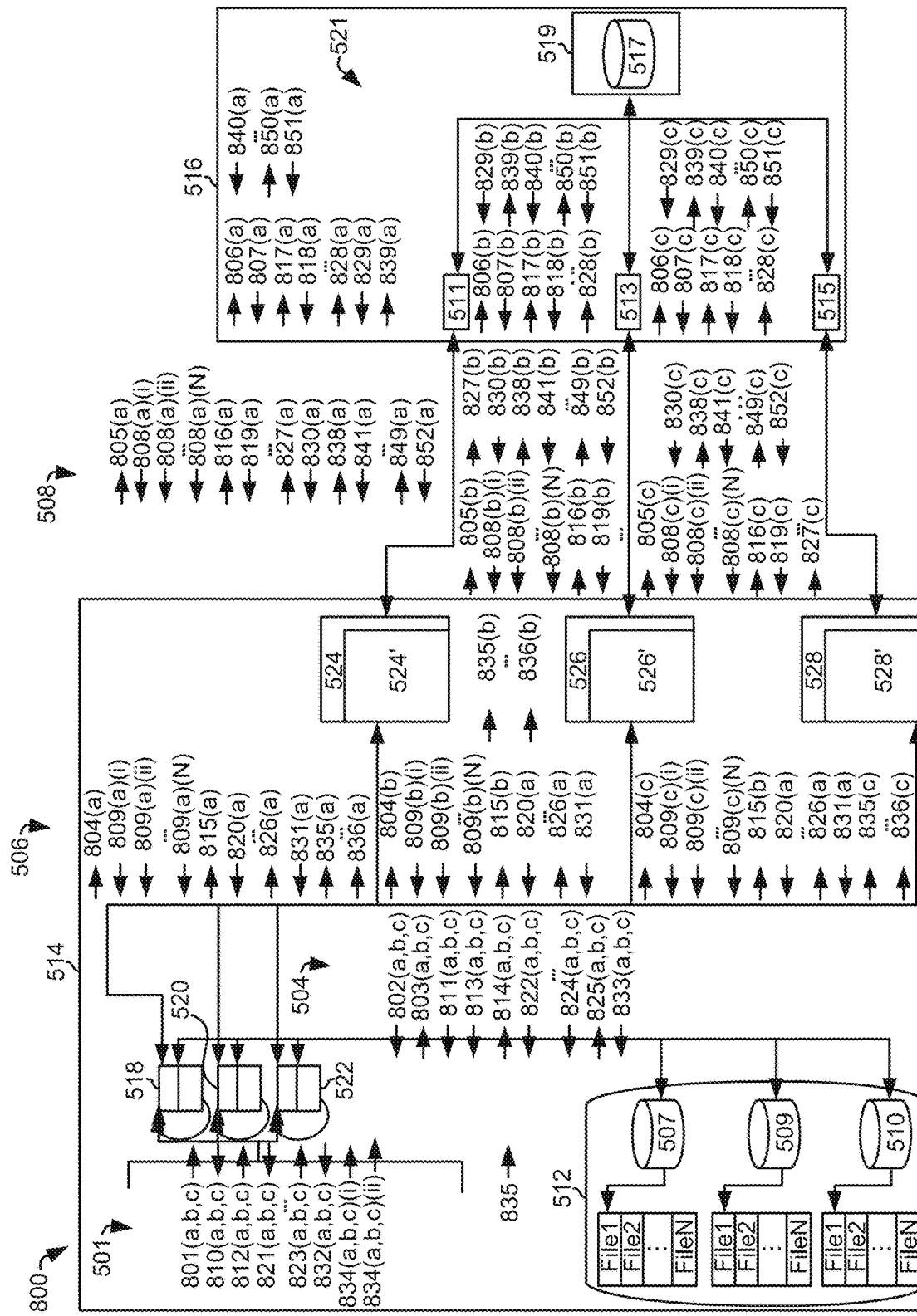

US 11,789,825 B2

HASHING INFORMATION OF AN INPUT/OUTPUT (I/O) REQUEST AGAINST A PLURALITY OF GATEWAY NODES

BACKGROUND

The present invention relates to clustered file system environments, and more specifically, this invention relates to data transfer from a first cluster site to a second cluster site according to a distributed workload protocol to enable disaster recovery (DR), backup, and/or migration solutions having relatively high efficiencies and throughput.

File systems may exist and be shared at more than one physical location where the file system is mounted on multiple servers. One specific type of such a shared file system includes a clustered file system. Clustered file systems are often used to store redundant copies of data, and enable use of different servers to access a common file at the same time. For example, a first copy of an instance of data may be stored on a local cluster site, and a second copy of the instance of data may be stored on a remote cluster site. In some clustered file systems, data is migrated from a first cluster site to a second cluster site, e.g., such as to enable a DR platform, to serve as a data backup, to migrate data to a new cluster site, etc.

SUMMARY

A computer-implemented method according to one embodiment includes receiving, on a first cluster site, a first I/O request to migrate a plurality of filesets from a second cluster site to the first cluster site. The first cluster site includes a plurality of gateway nodes. The method further includes identifying at least two of the gateway nodes having resources available to perform operations of the migration, and hashing information of a plurality of filesets against the identified gateway nodes. The information includes inode numbers of entities that are mounted during fulfillment of the first I/O request. Operations of the first I/O request are distributed to the identified gateway nodes based on the hashing, and the identified gateway nodes are instructed to fulfill the operations.

A computer program product according to another embodiment includes a computer readable storage medium having program instructions embodied therewith. The program instructions are readable and/or executable by a controller to cause the controller to perform the foregoing method.

A system according to another embodiment includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a clustered file system environment, in accordance with one embodiment.

FIG. 8 is a clustered file system environment, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products configured to transfer data from a first cluster site to a second cluster site according to a distributed workload protocol to enable disaster recovery (DR), backup, and/or migration solutions having relatively high efficiencies and throughput.

In one general embodiment, a computer-implemented method includes receiving, on a first cluster site, a first I/O request to migrate a plurality of filesets from a second cluster site to the first cluster site. The first cluster site includes a plurality of gateway nodes. The method further includes identifying at least two of the gateway nodes having resources available to perform operations of the migration, and hashing information of a plurality of filesets against the identified gateway nodes. The information includes inode numbers of entities that are mounted during fulfillment of the first I/O request. Operations of the first I/O request are distributed to the identified gateway nodes based on the hashing, and the identified gateway nodes are instructed to fulfill the operations.

In another general embodiment, a computer program product includes a computer readable storage medium having program instructions embodied therewith. The program instructions are readable and/or executable by a controller to cause the controller to perform the foregoing method.

In another general embodiment, a system includes a processor and logic integrated with the processor, executable by the processor, or integrated with and executable by the processor. The logic is configured to perform the foregoing method.

Figure 1:
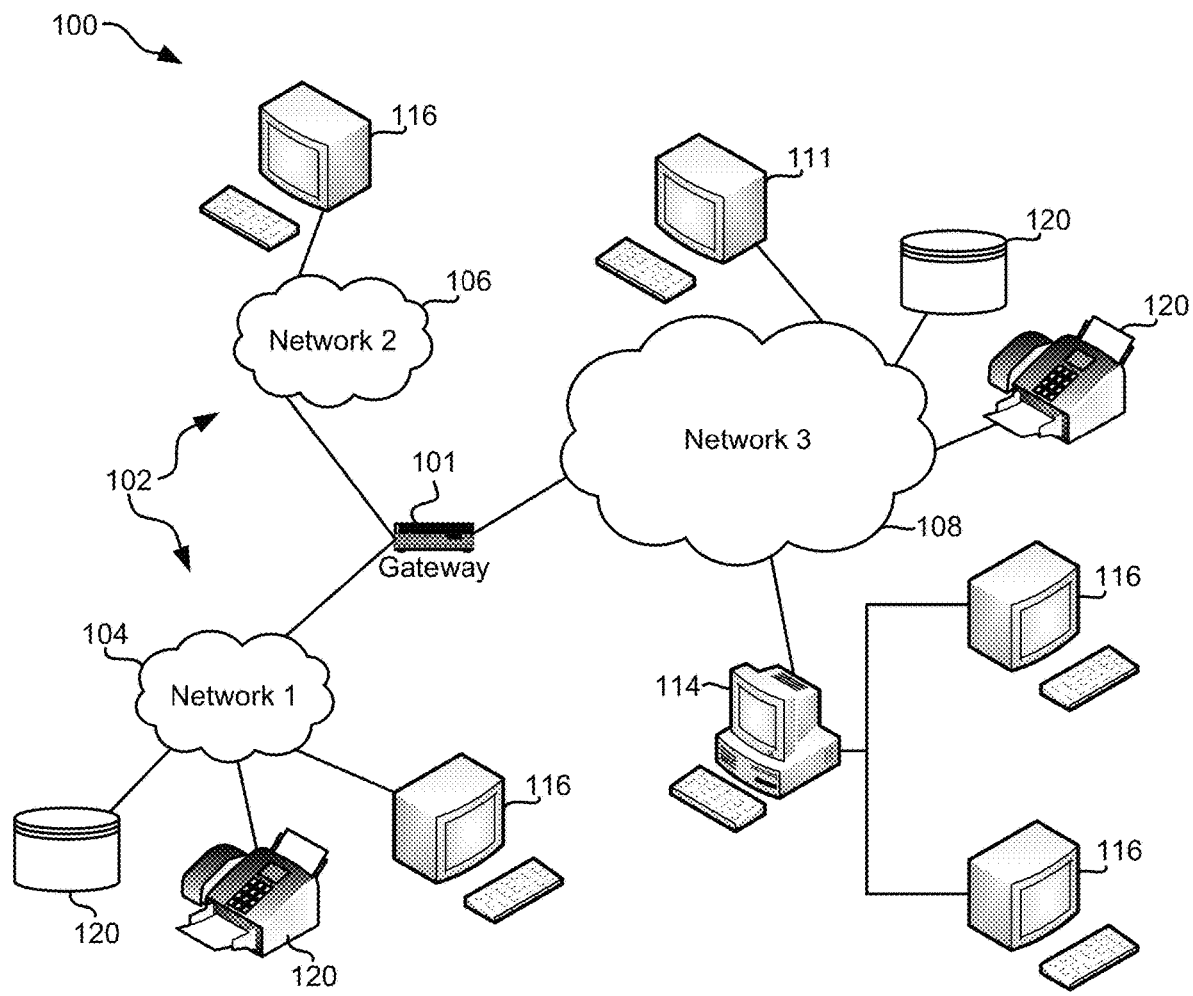
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
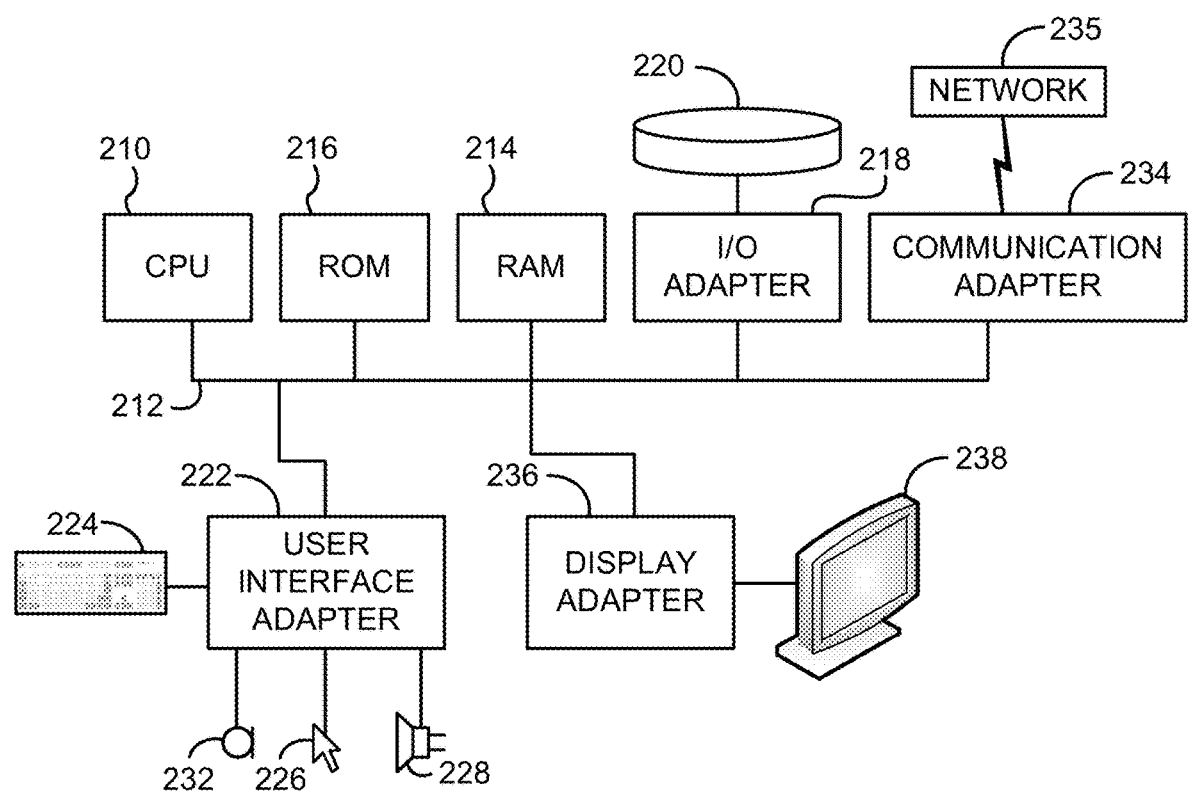
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
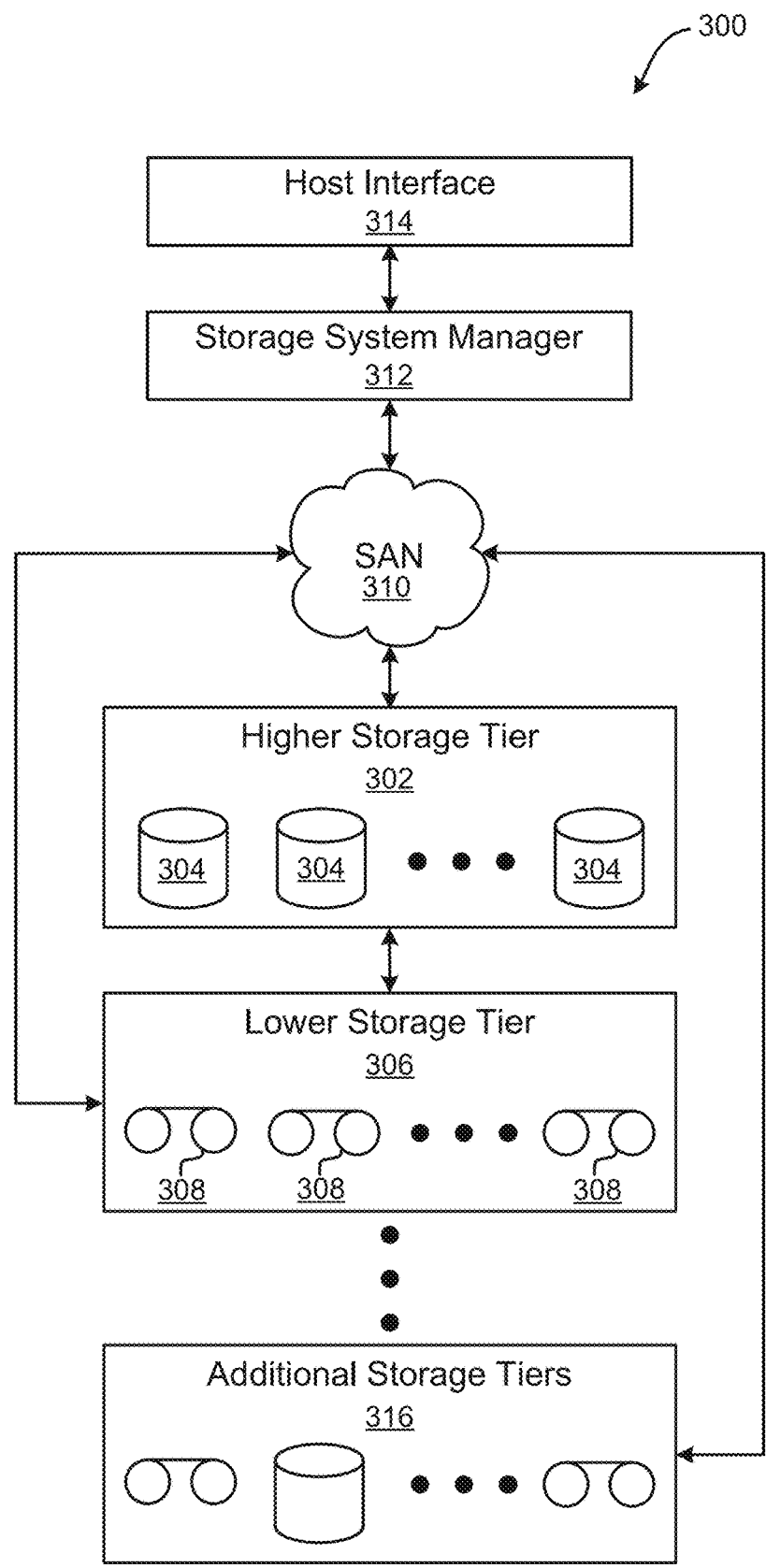
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD- ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, file systems may exist and be shared at more than one physical location where the file system is mounted on multiple servers. One specific type of such a shared file system includes a clustered file system. Clustered file systems are often used to store redundant copies of data, and enable use of different servers to access a common file at the same time. For example, a first copy of an instance of data may be stored on a local cluster site, and a second copy of the instance of data may be stored on a remote cluster site.

In some clustered file systems, data is migrated from a first cluster site to a second cluster site, e.g., such as to enable a DR platform, to serve as a data backup, to migrate data to a new cluster site, etc. In some relatively high performance clustered file systems, as a storage structure becomes outdated over time, e.g., slower than an average storage structure, having relatively less storage capacity than an average storage structure, etc., there may be a demand, such as a client demand, for establishing an updated filesystem. One technique for updating a filesystem may involve migrating data from the existing cluster site to a new cluster site, e.g., migrated from a home/old production cluster to a cache/new production cluster. Ideally, a goal of such migration may include the option to fetch over all the data from the home cluster to the cache cluster, and be able to provide essentially no downtime, e.g., implying that the only downtime would include switching over applications from the home cluster to the cache cluster.

Various embodiments and approaches described herein include balancing requests received from application nodes, across a plurality of gateway nodes having available processing resources. In some of such embodiments and approaches, the received requests may be balanced across all available gateway nodes. The balancing of the requests across the application nodes may be tunable such that a given filesystem and/or a single fileset having a large number of inodes and/or objects contained therein may be processed by every gateway having available resources. This enables an entire filesystem and/or fileset, in addition to the data and metadata associated therewith, to be fetched from an existing cluster site to a new cluster site along multiple gateway nodes.

Figure 4:
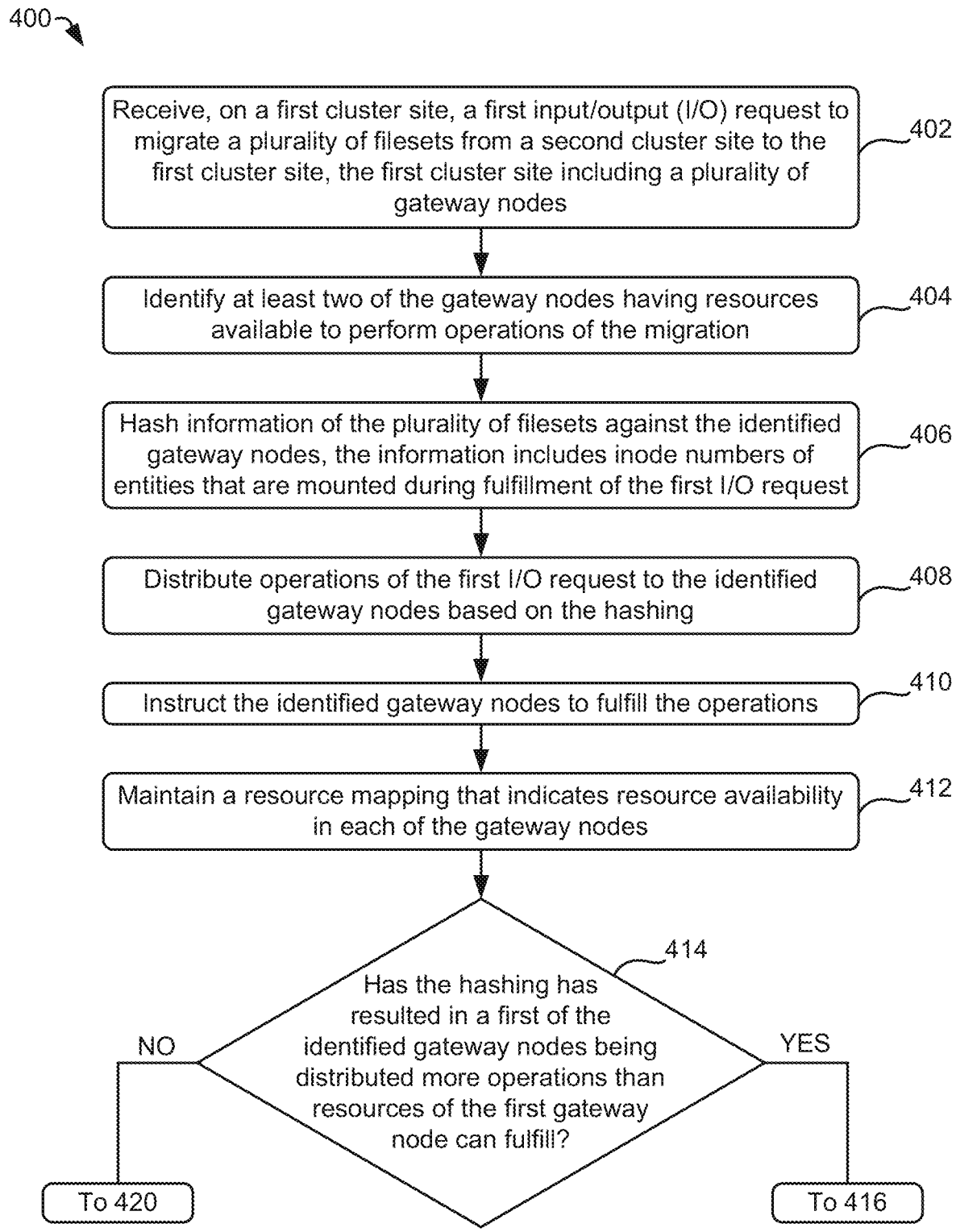
FIG. 4 is a flowchart of a method, in accordance with one embodiment.
Figure 4:
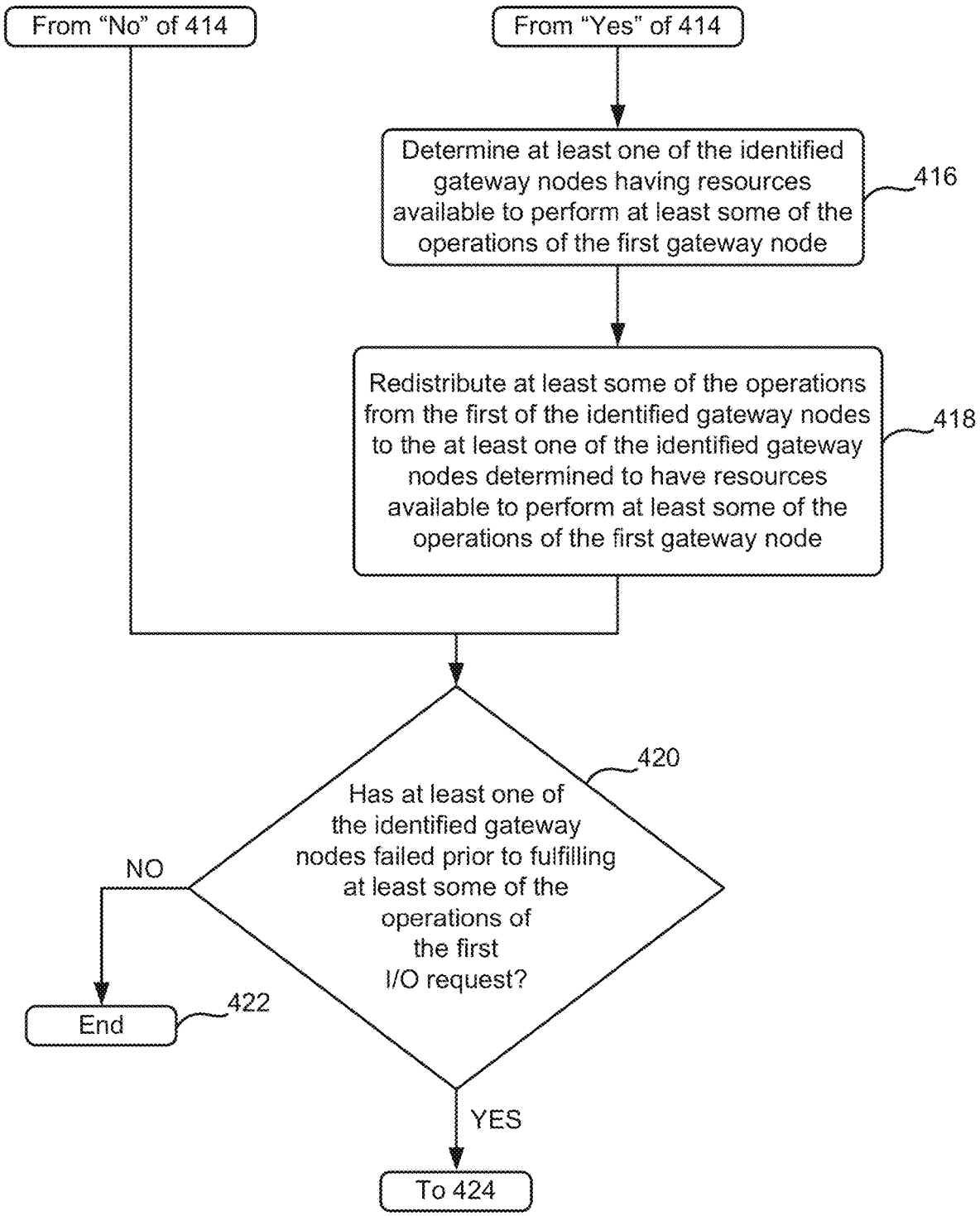
Figure 4:
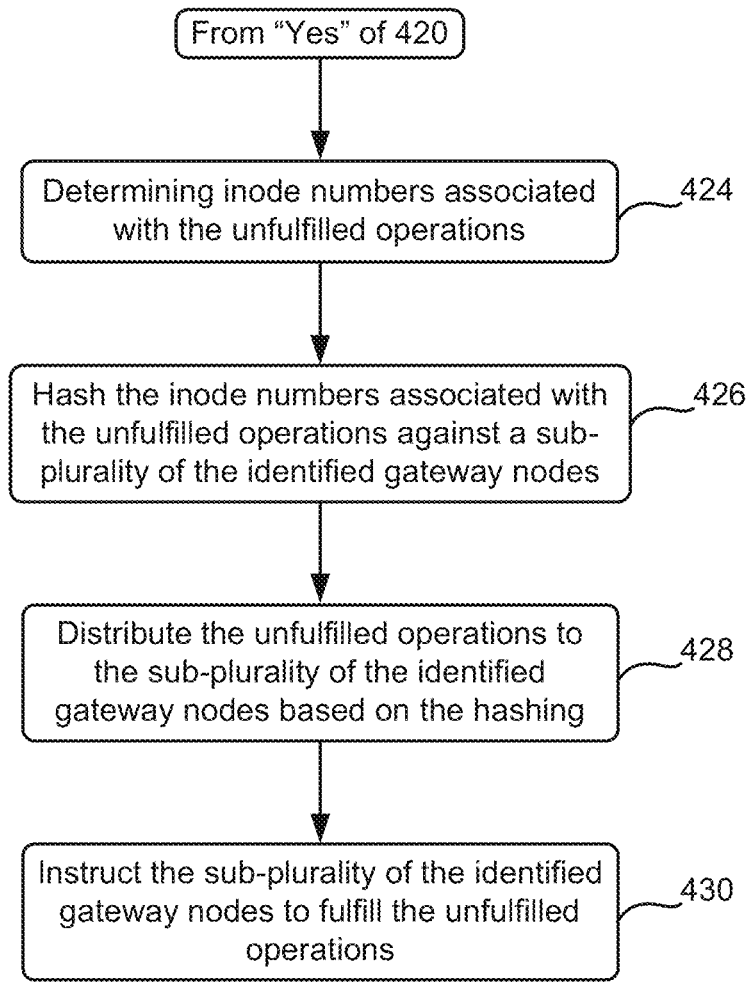

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes receiving, on a first cluster site, a first input/output (I/O) request to migrate a plurality of filesets from a second cluster site to the first cluster site. For context, the first I/O request may be any known type of I/O request. For example, according to various approaches, the first I/O request may include, e.g., a request to enable a DR platform on the first cluster site, a request to serve a data backup, a request to migrate data from the second cluster site to the first cluster site, etc. Moreover, in some approaches, the first cluster site may specify one or more operations that are to be performed in fulfilling the first I/O request. Operations of the first I/O request may, depending on the approach, include, e.g., read operations, readdir operations, lookup operations, getattr operations, etc.

In some preferred approaches, the first cluster site includes a plurality of gateway nodes, e.g., at least a first gateway node and a second gateway node. Accordingly, in one approach, the first I/O request may be received on at least one gateway node of the first cluster site, e.g., a first gateway node of the first cluster site, a second gateway node of the first cluster site, a tenth gateway node of the first cluster site, etc. In some other approaches, the first I/O request may be received on a known type of communication component that is included in the first cluster site, e.g., such as a controller, a queue, a storage location, etc.

Operation 404 of method 400 includes identifying at least two of the gateway nodes on the first cluster having resources available to perform at least some of the operations of the migration of the plurality of filesets. In one approach, identifying at least two of the gateway nodes having resources available to perform operations of the migration may include performing a query to determine which of the plurality of nodes of the first cluster have less than a predetermined amount of resources available to perform at least some of the operations, e.g., a relative percentage of the gateway node's total resources. In another approach, identifying at least two of the gateway nodes having resources available to perform operations of the migration may include accessing a list of gateway nodes that have at least a predetermined amount of available resources. In such an approach, method 400 may optionally including updating the list depending on the current respective workloads of each of the gateway nodes.

The operations of the first I/O request are distributed to the identified gateway nodes, e.g., see operation 408 of method 400. More specifically, according to various approaches, the operations of the first I/O request are preferably distributed to a plurality of the identified gateway nodes, at least two of the identified gateway nodes, a majority of the identified gateway nodes, all of the identified gateway nodes, etc. It should be noted that the operations of the first I/O request may preferably be distributed to a plurality of the identified gateway nodes in order to prevent reliance on a single gateway node for fulfilling the first I/O request. This is useful and relatively safer than distributing operations to only a single gateway node because otherwise assigning all operations of the first I/O request to only a single available gateway node may result in a failed data migration operation in the event that the single gateway node loses functionality during the migration process. The distribution of the operations across multiple of the identified gateway nodes also enables streamlines fulfillment of the first I/O request. This is because the available resources of the plurality of gateway nodes contribute to fulfilling the I/O request, which is likely relatively more resources than a single gateway node would otherwise be able to provide. Accordingly, the techniques of various embodiments and approaches described herein to distribute operations of the first I/O request to a plurality of the identified gateway nodes may be used to enable disaster recovery (DR), backup, and/or migration solutions having relatively high efficiencies and throughput.

In one approach, distributing the operations includes hashing information of the plurality of filesets against the identified gateway nodes, e.g., see operation 406 of method 400. The hashing may be performed using one or more known techniques for hashing information against gateway nodes. The information of the plurality of filesets may in one preferred approach include inode numbers of entities that are mounted during fulfillment of the first I/O request. In one approach, in order to enable such hashing, each inode may be maintained on the in-memory cache of exactly one gateway node of the plurality of gateway nodes. This may be applied to an operating system cache and a network file system (NFS) client cache.

It is important to note that hashing inode numbers of entities that are mounted during fulfillment of an I/O request against a plurality of gateway nodes has heretofore not been considered in a clustered file system environment. This is because conventional clustered file system environments utilize a single gateway node for fulfilling a received I/O request such as during a data migration. Accordingly, the inventive discoveries disclosed herein with regards to using a plurality of gateway nodes for fulfilling a received I/O request, and more specifically hashing inode numbers of entities that are mounted during fulfillment of an I/O request against a plurality of gateway nodes proceeds contrary to conventional wisdom.

The distribution of the operations across multiple of the identified gateway nodes may be based on the information being hashing according to a predetermined hashing ratio. For example, in one preferred approach, the inode numbers may be evenly hashed to a unique one of the identified gateway nodes during the hashing, e.g., 100 inodes may be hashed to 100 gateway nodes, three inodes may be hashed to three gateway nodes, twenty inodes may be hashed to twenty gateway nodes etc. In another approach, the number of inode numbers that are hashed to a given one of the identified gateway nodes during the hashing may be proportional to the amount of processing resources available on the given one of the identified gateway nodes. For example, a first number of inode numbers may be hashed to a first identified gateway node, and based on a second identified gateway node having twice the amount of processing resources that the first identified gateway nodes has, a second number of inode numbers may be hashed to the second identified gateway node. In this example, the second number of inodes is twice the amount of inodes as the first number of inodes. Note that an amount of processing resources of a gateway node may change based on the gateway node completing operations assigned thereto. Accordingly, as will be described elsewhere herein, in some approaches method 400 may include redistributing the operations of the first I/O request to the identified gateway nodes, and therefore the operations of the first I/O request may be dynamically assigned and reassigned to the identified gateway nodes depending on the approach.

Subsequent to the operations of the first I/O request being distributed to one or more gateway nodes, method 400 may include instructing that the gateway node(s) fulfill the operations, e.g., see operation 410.

A resource mapping that indicates resource availability in each of the gateway nodes may be maintained in some approaches, e.g., see operation 412 of method 400. Note that although the method 400 in FIG. 4 illustrates such a maintaining operation to follow one or more other operations, an order in which one or more of the operations of method 400 are performed may depend on the approach. For example, in some approaches, the resource mapping that indicates resource availability in each of the gateway nodes may be maintained at all times, and therefore the hashing of the information may be based on information of the resource mapping. According to a more specific example, the inode numbers may be hashed proportionately against the gateway nodes, where the number inode numbers that are hashed to a given one of the gateway nodes is based on an amount of resources available on the given gateway nodes, e.g., as determined from the resource mapping.

In some approaches it may be determined, e.g., see decision 414 of method 400, whether the hashing has resulted in one or more of the identified gateway nodes being distributed an amount of operations that the gateway node is unlikely to fulfill, e.g., unlikely to fulfill within a predetermined amount of time, unlikely to fulfill based on one or more of the gateway nodes failing in attempting to perform more operations than resources of the first gateway node can fulfill, etc. Such a determination may in some approaches be performed using known techniques for predicting a failure event in a gateway node that is performing operations. In some other approaches, an indication, e.g., a failure notice, a warning that a gateway node is experiencing one or more predetermined symptoms that are known to be associated with gateway nodes that fail, etc., may be received that the hashing has resulted in a first of the identified gateway nodes being distributed more operations than resources of the first gateway node can fulfill. A determination that the hashing has resulted in one or more of the identified gateway nodes being distributed an amount of operations that the gateway node is unlikely to fulfill may in some approaches be based on receiving such an indication. Based on a determination that the hashing has resulted in a first of the identified gateway nodes being distributed more operations than resources of the first gateway node can fulfill, e.g., as illustrated by the "YES" logical path of decision 414, at least one of the identified gateway nodes having resources available to perform at least some of the operations of the first gateway node may be determined, e.g., see operation 416 of method 400. In one approach, at least one of the identified gateway nodes having resources available to perform at least some of the operations of the first gateway node may be determined from an accessing of the resource mapping. For example, identified gateway nodes having more than a predetermined amount of available resources may be identified in the resource mapping. Note that at least some of the resources of the identified gateway nodes may be available based on the gateway nodes having completed one or more of the operations distributed thereto. Operation 418 of method 400 includes redistributing at least some of the operations from the first of the identified gateway nodes to the at least one of the identified gateway nodes determined to have resources available to perform at least some of the operations of the first gateway node.

In the example above, redistributing the at least some of the operations of the first gateway node to the at least one of the gateway nodes determined to have resources available to perform at least some of the operations of the first gateway node may include hashing the inode numbers of at least some of the operations of the first gateway node, e.g., inode numbers previously hashed against the first gateway node, against the gateway nodes determined to have resources available to perform at least some of the operations of the first gateway node. It should be noted that redistributing at least some operations of a gateway nodes determined to have been distributed more operations than resources of the gateway node can fulfill, may prevent the gateway node from failing. A gateway node failing during a migration being performed may otherwise increase the time that the migration takes. Accordingly, avoiding failure of gateway nodes based on redistribution techniques directly correlates with a reduced migration time and thereby an increased migration efficiency.

Although in some approaches, failure events of gateway nodes may be avoided using various techniques described elsewhere above, one or more of the gateway nodes may fail prior to fulfilling one or more operations of the first I/O request. Accordingly, it may be determined whether at least one of the identified gateway nodes has failed prior to fulfilling at least some of the operations of the first I/O request, e.g., prior to fulfilling at least some of the operations of the first I/O request distributed to the at least one of the identified gateway nodes, e.g., see decision 420 of method 400. A determination that at least one of the identified gateway nodes has failed prior to fulfilling at least some of the operations of the first I/O request may be based on, e.g., a loss of an established communication with the gateway node, a determination that the gateway node is not actively performing data migration operations, a warning received from the gateway node, an indication that all of the resources of the gateway node have become available before the operations distributed to the gateway node have been completed, etc. A determination that at least one of the identified gateway nodes has not failed prior to fulfilling at least some of the operations of the first I/O request may be based on, e.g., a maintained established communication with the gateway node, a determination that the gateway node is actively performing data migration operations, a determination that resources of the gateway node have decreased in the resource mapping as a result of the gateway node performing one or more operations, etc.

In response to a determination that at least one of the identified gateway nodes has not failed prior to fulfilling at least some of the operations of the first I/O request, e.g., as illustrated by the "NO" logical path of decision 420, method 400 may be terminated, e.g., see "End" operation 422 of method 400. For context, in method 400 "terminating" may in one approach refer to a conclusion being made that the first I/O request has been fulfilled. In such an approach, method 400 may be resumed in response to receiving a second I/O request on the first cluster, e.g., a second request to migrate a plurality of filesets from the second cluster site to the first cluster site. Such a migration may be performed using one or more operations described herein with respect to the first I/O request.

In response to a determination that at least one of the identified gateway nodes has failed prior to fulfilling at least some of the operations of the first I/O request, e.g., as illustrated by the "YES" logical path of decision 420, the unfulfilled operations of the failed gateway node(s) may be redistributed to at least one of the other identified gateway nodes. In some approaches, the redistributing may include determining the inode numbers associated with the unfulfilled operations e.g., see operation 424 of method 400. The unfulfilled operations, e.g., operations that were not completed and/or initiated by the failed gateway node, may be determined using one or more techniques, e.g., checking the queue of the failed gateway node, outputting a request to the failed node for a list of unfulfilled operations, determining destinations of the migration operations to determine whether one or more of the operations were successfully performed, etc. The inode numbers of the identified unfulfilled operations may be determined using known techniques.

The inode numbers associated with the unfulfilled operations may be hashed against a sub-plurality of the identified gateway nodes, e.g., see operation 426 of method 400. For context, the sub-plurality of the identified gateway nodes may include one or more of the gateway nodes that are still functional. For example, in one approach, the sub-plurality of the gateway nodes may include gateway node determined to have fulfilled the operations of the first I/O requests distributed to the gateway node, e.g., determined from the resource mapping, determined based on a queue of the gateway node, etc. The sub-plurality of the gateway nodes may additionally and/or alternatively include a gateway node that is determined to have at least a predetermined amount of resources available to perform operations of the migration, e.g., determined from the resource mapping.

The unfulfilled operations may be distributed to the sub-plurality of the identified gateway nodes based on the hashing, e.g., see operation 428 of method 400. Moreover, the sub-plurality of the identified gateway nodes may be instructed to fulfill the unfulfilled operations, e.g., see operation 430 of method 400.

Although various approaches above have described that the information of the plurality of filesets is hashed against all of the identified gateway nodes, in some approaches, one or more of the gateway nodes may be reserved for performing operations of a predetermined type. As will be described below however, in one or more of such approaches, the information of the plurality of filesets that is not hashed to the reserved gateway node, is preferably still hashed against a plurality of the identified gateway nodes. For purposes of an illustrative example, it may be assumed that at least three of the gateway nodes having resources available to perform operations of the migration are identified, e.g., such as identified in operation 404 of method 400. In such an example, the hashing may include hashing inode numbers of asynchronous type operations, e.g., read requests, of the migration to a predetermined one of the identified of gateway nodes, e.g., a gateway node reserved for performing asynchronous type operations. Moreover, Mode numbers of synchronous type operations of the migration may be hashed to at least two of the identified gateway nodes. Operations may be distributed and executed by the gateway nodes according to the hashing. The practice of reserving a gateway node that Mode numbers of asynchronous type operations are hashed against may be optional in some approaches. For example, in one approach, subsequent to receiving an I/O request that includes one or more asynchronous type operations, method 400 may include hashing the Mode numbers associated with the asynchronous type operations to a predetermined gateway, and hashing the Mode numbers associated all other operations, e.g., the synchronous type operations, to the other gateway nodes. In some approaches all of the gateway nodes may already have at least some distributed operations. Accordingly, in one or more of such approaches, method 400 may optionally include redistributing the operations of one of the gateway nodes so that the gateway node is available for performing asynchronous type operations.

In some further approaches in which a single relatively large filesystem contains all of the Modes for migration, or just a few single relatively large filesets for migration, an admin may choose to tune all the available gateway nodes to be used for migration of data into these filesystem/fileset, and thereby the above described model of Mode number based hashing may ensure that a request on each individual object/file is be re-routed to a unique gateway node. As a result, a collective effort is established in which all gateway nodes fetch data onto the fileset.

In another approach, the existing fileset ID based hashing may remain, and be the default hashing method to select the gateway node. However, additional operations may also be incorporated. For example, each gateway node in the cluster may maintain a resource based map feature in which each gateway node is updated on resource availability on all the other gateway nodes. For example, this may be performed through the pings of Remote Procedure Calls (RPCs) such that each gateway node has an idea as to how free/busy the other gateway nodes are.

In cases where fileset based hashing bombards a single gateway node with more requests than the gateway node can handle, and in a similar respect, it is determined that there are other gateway nodes that are free of resources that can handle the given fileset's request, the request may be rerouted from the bombarded gateway node (and thereby any further request on the given fileset) to a new free resources available gateway node.

In this process, the bombarded gateway node preferably reports back to all the application nodes to update a mapping of the other application nodes for the given fileset, that a new gateway node, which is free of resources, has been selected. This may ensure that all new requests are directed to the new gateway node.

In an anticipation that an I/O request associated with a single large filesets/filesystem may be received, which may result in all the requests bombarding a single gateway node, one or more approaches described herein may include a choice of an asynchronous vs synchronous based nature of the migration request being sent to the gateway node(s). In one or more of such approaches, an application node may continually queue the asynchronous, e.g., prefetch, based read requests to a single gateway node, e.g., such as a node of a metadata server (MDS). The single gateway node may be selected based on the initial fileset ID based hash algorithm, such that all asynchronous operations are able to be handled on a respective time frame, e.g., based on asynchronous operations not affecting any applications being run on the application nodes in the cluster. In case there are synchronous requests originating at the application nodes, the hash algorithm may identify that the MDS is busy handling an abundance of queued asynchronous operations, the application nodes may route the request to any gateway node (other than the MDS gateway) to queue the request. Note that this routing may be based on the inode number based hash value.

The enhancements made available by utilizing one or more of the approaches described herein ensure that there is no single point of failure, and furthermore that a gateway node can be selectable for any node irrespective of any other node, e.g., other than the re-routes described elsewhere above.

Various illustrative examples of using a plurality of gateway nodes for fulfilling a received I/O request will now be described below, e.g., see FIGS. 5-8.

Figure 5:
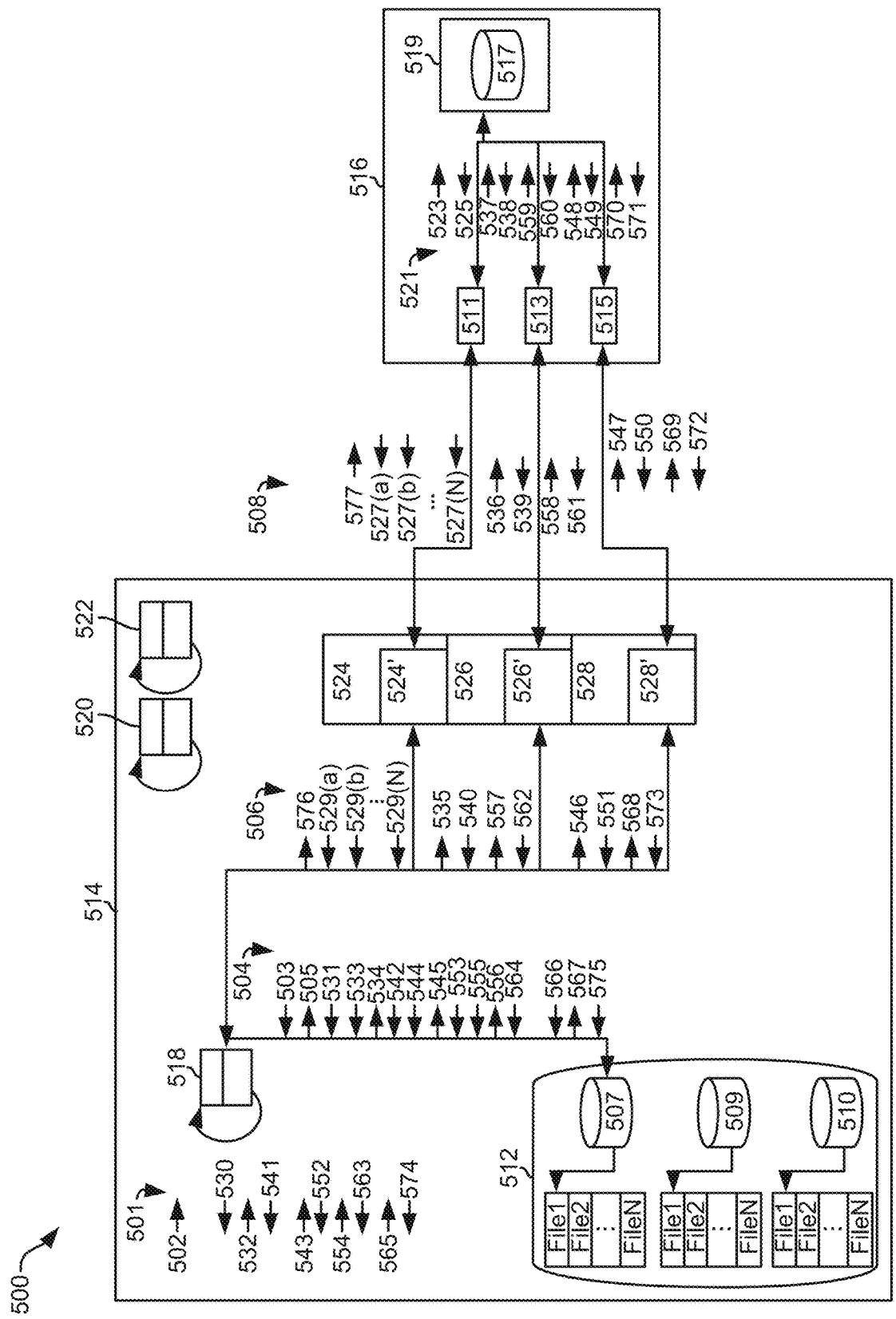
FIG. 5 is a clustered file system environment, in accordance with one embodiment.

FIG. 5 depicts a clustered file system environment 500, in accordance with one embodiment. As an option, the present clustered file system environment 500 may be implemented in conjunction with features from any other embodiment listed herein, such as those described with reference to the other FIGS. Of course, however, such clustered file system environment 500 and others presented herein may be used in various applications and/or in permutations which may or may not be specifically described in the illustrative embodiments listed herein. Further, the clustered file system environment 500 presented herein may be used in any desired environment.

In FIG. 5, various communications exchanged between a first cluster 514, e.g., a cache site in the current example, and a second cluster 516, e.g., a home site in the current example, of the clustered file system environment 500 are illustrated in accordance with one embodiment. In some approaches, each application node, e.g., see first application node 518, second application node 520, Nth application node 522, etc., takes a unique identifier of a fileset/filesystem, e.g., such as the numerical ID, and generates the gateway node ID to which the particular I/O requests of the fileset/filesystem are to be routed to by hashing the unique identifier against the number of operational gateway nodes in the first cluster 514, e.g., see first gateway node 524 having a queue 524', second gateway node 526 having a queue 526', and third gateway node 528 having a queue 528'. The application nodes may perform the same hashing technique to send the I/O requests to the same gateway node to efficiently resolve dependencies. It may be assumed for purposes of an example that the first application node 518 has an application running, while the second application node 520 and the Nth application node 522 do not have an application running (at a current time). Moreover, in one approach, all operations triggered are triggered on-demand by the application running.

The first cluster 514 includes a single large fileset/filesystem 512. The single large fileset/filesystem 512 includes a plurality of local directory inodes, e.g., local Dir1 inode 507, local Dir2 inode 509, and local DirN inode 510, each having extended attributes (EAs) about a remote inode.

The second cluster 516 includes a first NFS server node 511, a second NFS server node 513, and a third NFS server node 515. Moreover, the second cluster 516 includes a file system 519 having an inode counterpart on the local filesystem 517.

Right directional arrows of a first portion 501 of the first cluster 514 imply being directed from the application to the app node. Moreover, left directional arrows of the first portion 501 of the first cluster 514 imply being directed from the app node to the application. Moreover, left directional arrows of a second portion 504 of the first cluster 514 imply being directed from the node to the filesystem. Moreover, right directional arrows of the second portion 504 of the first cluster 514 imply being directed from the filesystem to the node. Left directional arrows of the third portion 506 of the first cluster 514 imply being directed from the app node (on a same application path) to the gateway nodes (chosen based on hash). Right directional arrows of the third portion 506 of the first cluster 514 imply being directed from the gateway nodes back to the app node. Right directional arrows of a third portion 508 imply being directed from a respective gateway node to the corresponding NFS server node. Moreover, left directional arrows of the third portion 508 imply being directed from the respective NFS server node back to the corresponding gateway node. Assuming a good case configuration that each unique gateway node at the first cluster 514 is mapped to each unique NFS server at the second cluster 516, a result may include an efficient load balancing occurring when played over the wire. In one approach, because operations such as readdir, lookup and read may be synchronous in nature, the gateway node may begin playing it immediately from the queue.

On the first portion 521 of the second cluster 516, right directional arrows imply being directed from the NFS server node to the filesystem, and left directional arrows imply being directed from the filesystem back to the NFS server node.

Various operations performed on the first cluster 514 and/or the second cluster 516, and therefore all operations triggered may be triggered on-demand by the application running. Communications exchanged between the first cluster 514 and/or the second cluster 516 are described below. At a high level, these descriptions describe a queuing and execution model for readdir lookup and on demand reads on a single uncached and incomplete directory from a single application node.

Operation 502 includes performing a search, e.g., an iterative search-1, on the first directory at cache from the first application node 518. This may trigger a complete readdir and a follow up lookup for each entry that is observed from performing the readdir. Subsequent to the readdit and the lookup, each of the files are individually fetched to the cache from home, by performing an on-demand read on each file.

Operation 503 includes triggering a readdir on an uncached and incomplete directory (Dir1) at cache.

Operation 505 includes returning that the directory is an uncached and incomplete directory (Dir1) at cache.

Operation 576 includes observing that the directory is not cached and incomplete and queuing and immediately playing the readdir (sync) on the directory (Dir1). The hash on the inode of Dir1 is handled by the first gateway node.

Operation 577 includes playing the sync readdir on Dir (Dir1).

Operation 523 includes performing a readdir on Dir(Dir1) to get all entries on the given directory.

Operation 525 includes returning all entries in the given directory.

Operation 527(a) includes acknowledging the readdir operation and sending Frame 1 of readdir contents to the first gateway node.

Operation 527(b) includes sending Frame 2 of the readdir contents to the first gateway node.

Operation 527(N) includes sending Frame N of the readdir contents to the first gateway node.

Operation 529(a) includes sending Frame 1 of the readdir contents, received from the NFS server, to the app node.

Operation 529(b) includes sending Frame 2 of the readdir contents, received from the NFS server, to the app node.

Operation 529(N) includes sending Frame N of the readdir contents, received from the NFS server, to the app node.

Operation 530 includes returning the results of readdir to the application.

Operation 531 includes storing the results of readdir on disk and marking the directory at cache. All of the entries in the directory are orphans, and there are no attributes about any of them at cache.

Operation 532 includes triggering a lookup on Entry1 received on readdir of directory (testDir).

Operation 533 includes triggering a lookup on Entry1 received on readdir of directory (Dir1) at cache.

Operation 534 includes returning that Entry1 is an orphan at cache.

Operation 535 includes observing that the Entry1 is an orphan and triggering a sync remote lookup on Entry1. The hash on inode of Entry1 targets this inode operation to the second gateway node.

Operation 536 includes playing the sync lookup operation on Entry1.

Operation 537 includes looking up attributes on Entry1.

Operation 538 includes returning attributes of Entry1.

Operation 539 includes returning the result of the lookup on Entry1.

Operation 540 includes returning the lookup on EntryN from the remote site to the app node.

Operation 541 includes returning the results of the lookup on Entry1 to the application.

Operation 542 includes putting the results of the lookup on Entry1 to disk. The attributes are now present, but not actual data.

Operation 543 includes triggering a lookup on EntryN received on readdir of directory (testDir).

Operation 544 includes triggering a lookup on EntryN received on readdir of directory (Dir1) at cache.

Operation 545 includes returning that EntryN is an orphan at cache.

Operation 546 includes observing that the EntryN is an orphan entry and triggering a sync remote lookup on Entry1. The hash on inode of EntryN targets this inode operation to the third gateway node.

Operation 547 includes playing the sync lookup operation on EntryN.

Operation 548 includes looking up attributes on EntryN.

Operation 549 includes returning attributes of EntryN.

Operation 550 includes returning the result of the lookup on EntryN.

Operation 551 includes returning the lookup on EntryN from the remote site to the app node.

Operation 552 includes returning the results of the lookup on EntryN to the application.

Operation 553 includes putting the results of the lookup on Entry1 to disk. The attributes are now present, but not actual data.

Operation 554 includes triggering a read on Entry1.

Operation 555 includes triggering a read on Entry1.

Operation 556 includes returning that Entry1 is uncached.

Operation 557 includes observing that Entry1 is uncached and triggering a sync remote read on Entry1. The hash on the inode of Entry1 targets this inode operation to the second gateway node.

Operation 558 includes playing the sync read operation on Entry1.

Operation 559 includes reading data on Entry1.

Operation 560 includes returning data of Entry1.

Operation 561 includes returning data of the read on Entry1.

Operation 562 includes returning data on Entry1 from the remote site to the app node.

Operation 563 includes returning data from the remote read on Entry1 to the application.

Operation 564 includes putting data of Entry1 to disk. The data and attributes are now present locally.

Operation 565 includes triggering a lookup on EntryN received on readdir of directory (testDir).

Operation 566 includes triggering a read operation on EntryN.

Operation 567 includes returning that EntryN is uncached.

Operation 568 includes observing that EntryN is uncached and triggering a sync remote read on EntryN. The hash on inode of EntryN targets this inode operation to the third gateway node.

Operation 569 includes playing the sync read operation on EntryN.

Operation 570 includes reading data on EntryN.

Operation 571 includes returning data of EntryN.

Operation 572 includes returning data of the read on EntryN.

Operation 573 includes returning data on EntryN from the remote site to the app node.

Operation 574 includes returning the results of the lookup performed on EntryN to the application.

Operation 575 includes putting data of EntryN to disk. The data and attributes are now present locally.

In one approach, the queues of the gateway nodes may have entries included therein. For example, it may be assumed that the queue 524' includes a sync readdir on directory command, the queue 526' includes a sync lookup on Entry1 command and a sync read on Entry1 command, and the queue 528' includes a sync lookup on EntryN command and a sync read on EntryN command.

The gateway configuration described in the clustered file system environment 500 is configured to utilize all available gateway nodes, as the app node when queuing the requests hashes the inode against the number of gateway nodes and queues the request to an appropriate gateway node, e.g., such as a gateway node determined to have available processing resources.

The approaches described above for the clustered file system environment 500 may be used as an asynchronous replication technique for replicating data from the first cluster 514 to the second cluster 516. In some approaches, the asynchronous replication techniques may effectively enable backup and/or DR, based on the queue being asynchronous in nature and being configured to operate independently of the application to achieve sync with the remote backup site. In some approaches, in a context of replication, the gateway node may consolidate all requests in an order in which they are performed. The gateway node may thereafter optimize them, e.g., such as using known techniques, and play them in such a way that all dependencies are resolved in the queue to play in the asynchronous manner.

Figure 6:
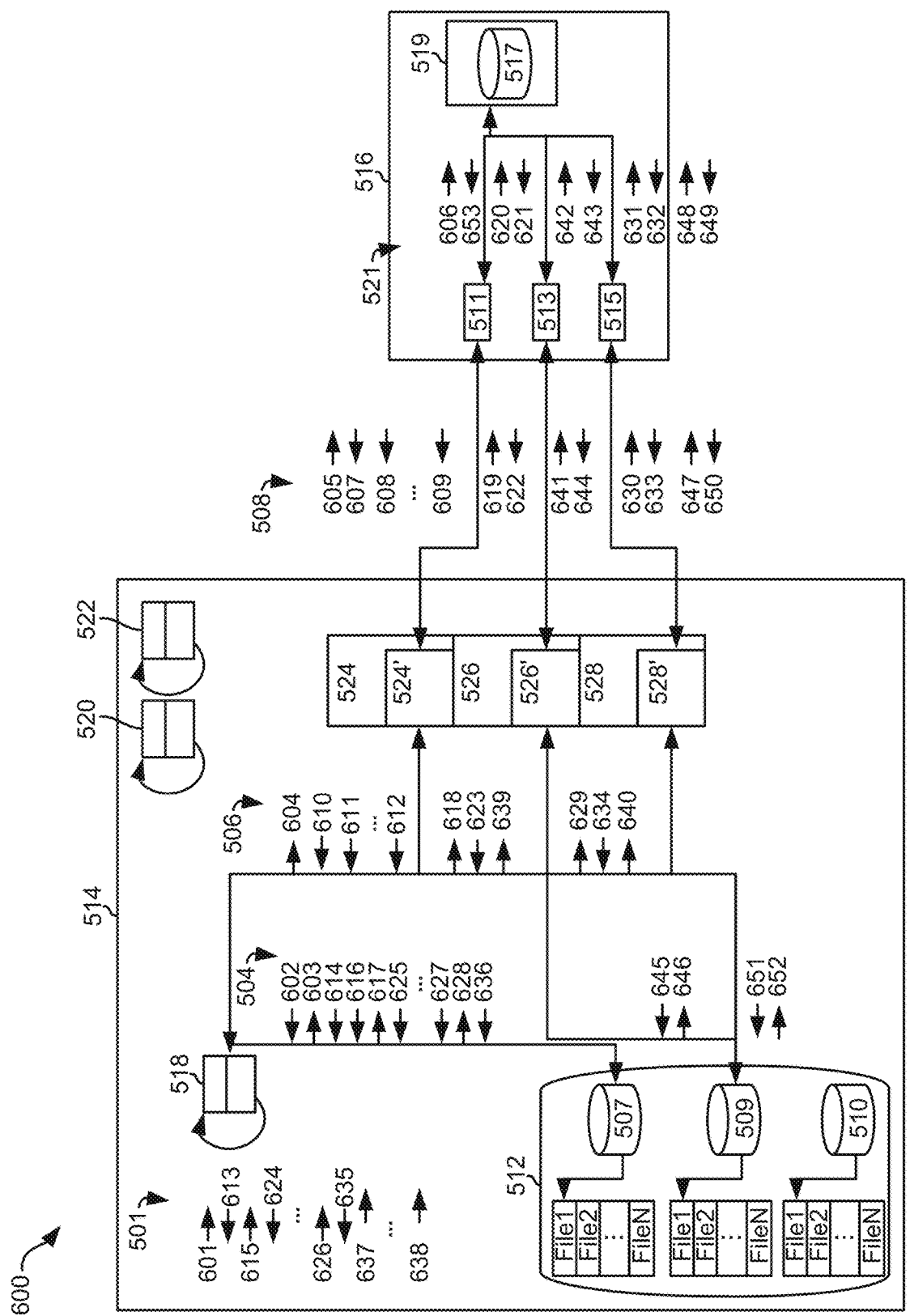
FIG. 6 is a clustered file system environment, in accordance with one embodiment.

Referring now to FIG. 6, in some approaches, data migration scenarios may be configured based on a synchronous nature of operations performed therein. Data migration that includes synchronous based operations, e.g., see FIG. 6, may differ at least slightly from data migration that includes asynchronous based operations, e.g., see FIG. 5, because the dependencies of asynchronous based operations may already be resolved by the application and therefore this burden does not fall on the gateway node and the queue that processes the requests. The bulk of the asynchronous reads that are queued for prefetch purpose may additionally be all independent of one another, and therefore may not depend on the other reads or other asynchronous and/or synchronous operations in the queue. Accordingly, the net queue that arises from migration uses cases may be independent in nature, and there may be no related purpose similar to the case of an asynchronous replication scenario in which all the operations are more efficiently performed as a result of being arranged, e.g., preprocessed, ordered, coalesced, filtered, etc., at a single gateway node in order to be able to achieve data sanity and sync, e.g., shown in FIG. 6.

FIG. 6 depicts a clustered file system environment 600, in accordance with one embodiment. As an option, the present clustered file system environment 600 may be implemented in conjunction with features from any other embodiment listed herein, such as those described with reference to the other FIGS. Of course, however, such clustered file system environment 600 and others presented herein may be used in various applications and/or in permutations which may or may not be specifically described in the illustrative embodiments listed herein. Further, the clustered file system environment 600 presented herein may be used in any desired environment.

It should be noted that various components and/or communications of the clustered file system environment 500 of FIG. 5 may be similar to various components and/or communications of the clustered file system environment 600 of FIG. 6. Accordingly, FIG. 5 and FIG. 6 may share some common numberings.

In FIG. 6, various communications exchanged between a first cluster 514, e.g., a cache site in the current example, and a second cluster 516, e.g., a home site in the current example, of the clustered file system environment 600 are illustrated in accordance with one embodiment. The first cluster 514 includes a plurality of clusters, e.g., see first application node 518, second application node 520, Nth application node 522, etc.

It may be assumed for purposes of an example that the first application node 518 has an application running, while the second application node 520 and the Nth application node 522 do not have an application running (at a current time). Moreover, in one approach, all operations triggered are triggered by the admin as prefetch for data that may be required by all applications at a later point in time.

The first cluster 514 includes a single large fileset/filesystem 512. The single large fileset/filesystem 512 includes a plurality of local directory inodes, e.g., local Dir1 inode 507, local Dir2 inode 509, and local DirN inode 510, each having extended attributes (EAs) about a remote inode. The second cluster 516 includes a first NFS server node 511, a second NFS server node 513, and a third NFS server node 515. Moreover, the second cluster 516 includes a file system 519 having an inode counterpart on the local filesystem 517.

Right directional arrows of a first portion 501 of the first cluster 514 imply being directed from the application to the app node. Moreover, left directional arrows of the first portion 501 of the first cluster 514 imply being directed from the app node to the application. Moreover, left directional arrows of a second portion 504 of the first cluster 514 imply being directed from the node to the filesystem. Moreover, right directional arrows of the second portion 504 of the first cluster 514 imply being directed from the filesystem to the node. Left directional arrows of the third portion 506 of the first cluster 514 imply being directed from the app node (on a same application path) to the gateway nodes (chosen based on hash). Right directional arrows of the third portion 506 of the first cluster 514 imply being directed from the gateway nodes back to the app node. Right directional arrows of a third portion 508 imply being directed from a respective gateway node to the corresponding NFS server node. Moreover, left directional arrows of the third portion 508 imply being directed from the respective NFS server node back to the corresponding gateway node. Assuming a good case configuration that each unique gateway node at the first cluster 514 is mapped to each unique NFS server at the second cluster 516, a result may include an efficient load balancing occurring when played over the wire. In one approach, because operations such as readdir, lookup and read may be synchronous in nature, the gateway node may begin playing it immediately from the queue. In one approach, async reads queued for prefetch may be played at async delay intervals, and meanwhile room may be made for any and all synchronous operations that the app nodes might queue.

On the first portion 521 of the second cluster 516, right directional arrows imply being directed from the NFS server node to the filesystem, and left directional arrows imply being directed from the filesystem back to the NFS server node.

Communications exchanged between the first cluster 514 and/or the second cluster 516 are described below. At a high level, these descriptions describe a queuing and execution model for readdir lookup and on demand reads on a single uncached and incomplete directory from a single application node.

Operation 601 includes performing a prefetch on an entire directory (Dir2) by triggering a directory prefetch. Subsequent to the readdir, the prefetch may include performing a lookup on each of the files and queues an async read directly to a gateway node.

Operation 602 includes triggering a readdir on an uncached and incomplete directory (dir1) at cache.

Operation 603 includes returning that the directory is uncached and incomplete directory (dir1) at cache.

Operation 604 includes observing that the directory is not cached and incomplete, queued and immediately play the readdir (sync) on directory (Dir1). The hash on inode of Dir1, receives this and it is preferably be executed by the first gateway node.

Operation 605 includes playing the sync readdir operation on Dir (Dir1).

Operation 606 includes performing a readdir on a directory (Dir1) to get all entries on the given directory.

Operation 653 includes returning entries in the given directory.

Operation 607 includes acknowledging a readdir operation and sending frame 1 of readdir contents to the gateway node.

Operation 608 includes sending frame 2 of readdir contents to the gateway node.

Operation 609 includes sending frame N of readdir contents to the gateway node.

Operation 610 includes sending frame 1 of readdir contents, received from the NFS server, to the app node.

Operation 611 includes sending frame 2 of readdir contents, received from the NFS server, to the app node.

Operation 612 includes sending frame N of readdir contents, received from the NFS server, to the app node.

Operation 613 includes returning the results of the readdit to prefetch.

Operation 614 includes putting results of readdir on disk and marking the directory as cached and competing directory (Dir1) at cache. All the entries in the directory are orphans, and there is no attributes about any of them at cache.

Operation 615 includes triggering a lookup on Entry1 received on readdir of directory (dir2).

Operation 616 includes triggering a lookup on Entry1 received on readdir of directory (Dir1) at cache.

Operation 617 includes returning that Entry1 is an orphan at cache.

Operation 618 includes observing that Entry1 is an orphan entry and triggering sync remote lookup on Entry1. The hash on inode of Entry1 targets the inode operation to the second gateway node.

Operation 619 includes playing the sync lookup operation on Entry1.

Operation 620 includes performing a lookup operation for attributes on Entry1.

Operation 621 includes returning attributes of Entry1.

Operation 622 includes returning the result of the lookup on Entry1.

Operation 623 includes returning the lookup on EntryN from the remote site to the app node.

Operation 624 includes returning the results of the lookup on Entry1 to prefetch.

Operation 625 includes putting results of lookup on Entry1 to disk. Attributes are now present, but not actual data.

Operation 626 includes triggering a lookup on EntryN received on readdir of directory (testDir).

Operation 627 includes triggering a lookup on entry N received on readdir of directory (dir1) at cache.

Operation 628 includes returning that EntryN is an orphan at cache.

Operation 629 includes observing that the EntryN is an orphan entry and triggering a sync remote lookup on Entry1. The hash on the inode of EntryN targets the inode operation to the third gateway node.

Operation 630 includes playing the sync lookup operation on EntryN.

Operation 631 includes performing a lookup operation for attributes on EntryN.

Operation 632 includes returning attributes of EntryN.

Operation 633 includes returning the result of the lookup on EntryN.

Operation 634 includes returning the lookup in EntryN from the remote site to the app node.

Operation 635 includes returning the results of the lookup on EntryN to prefetch.

Operation 636 includes putting results of the lookup on EntryN to disk. Attributes are now present, but not actual data.

Operation 637 includes triggering an async read on Entry1.

Operation 638 includes triggering an async read on EntryN.

Operation 639 includes observing that the Entry1 is uncached and triggering an async remote read on Entry1. The hash on inode of Entry1 targets this inode operation to the second gateway node.

Operation 640 includes observing that the EntryN is uncached and triggering an async remote read on EntryN. The hash on the inode of EntryN targets the inode operation to the third gateway node.

Operation 641 includes playing the sync read operation on Entry1.

Operation 642 includes reading data on Entry1.

Operation 643 includes returning data of Entry1.

Operation 644 includes returning data of the read operation on Entry1.

Operation 645 includes putting data of Entry1 to disk (directly from the second gateway node to the filesystem). Data and attributes are now present locally.

Operation 646 includes acknowledging a data write to local FS.

Operation 647 includes playing the sync read operation on EntryN.

Operation 648 includes reading data on EntryN.

Operation 649 includes returning data of EntryN.

Operation 650 includes returning data of the read operation on EntryN.

Operation 651 includes putting data of EntryN to disk (directly from the second gateway node to the filesystem). Data and attributes are now present locally.

Operation 652 includes acknowledging a data write to local FS.

Note that in one approach, the queues of the gateway nodes may have entries included therein. For example, it may be assumed that the queue 524' includes a sync readdir on directory command, the queue 526' includes a sync lookup on Entry1 command and an ssync read on Entry1 command, and the queue 528' includes a sync lookup on EntryN command and an async read on EntryN command.

Utilizing various of the operations described above, the operations on the plurality of inodes on the single large fileset/filesystem are evenly distributed for balancing the communications between the first and second clusters 514, 516 (respectively). It should be noted that such a distribution is tuneable, such that one gateway or a plurality of gateways may be used for a workload depending on the approach. This distribution may be performed using similar techniques as those described above, e.g., see FIG. 5, in which all operations of a fileset are assigned to a single gateway node. However, instead of using fileset and/or filesystem unique identifiers, the inode number of the entity, which is unique on a given filesystem, is utilized for performed hashing.

FIG. 7 depicts a clustered file system environment 700, in accordance with one embodiment. As an option, the present clustered file system environment 700 may be implemented in conjunction with features from any other embodiment listed herein, such as those described with reference to the other FIGS. Of course, however, such clustered file system environment 700 and others presented herein may be used in various applications and/or in permutations which may or may not be specifically described in the illustrative embodiments listed herein. Further, the clustered file system environment 700 presented herein may be used in any desired environment.

It should be noted that various components and/or communications of the clustered file system environment 700 of FIG. 7 may be similar to various components and/or communications of the clustered file system environment 600 of FIG. 6 and/or the clustered file system environment 500 of FIG. 5. Accordingly, FIG. 5, FIG. 6 and FIG. 7 may share some common numberings.

In FIG. 7, various communications exchanged between a first cluster 514, e.g., a cache site in the current example, and a second cluster 516, e.g., a home site in the current example, of the clustered file system environment 700 are illustrated in accordance with one embodiment. The first cluster 514 includes a plurality of clusters, e.g., see first application node 518, second application node 520, Nth application node 522, etc.

It may be assumed for purposes of an example that each of the application nodes have an application running. Moreover, in one approach, all operations triggered may be triggered on-demand by the application running on app nodes, e.g., the first application node 518 through the Nth application node 522.

The first cluster 514 includes a single large fileset/filesystem 512. The single large fileset/filesystem 512 includes a plurality of local directory inodes, e.g., local Dir1 inode 507, local Dir2 inode 509, and local DirN inode 510, each having extended attributes (EAs) about a remote inode. The second cluster 516 includes a first NFS server node 511, a second NFS server node 513, and a third NFS server node 515. Moreover, the second cluster 516 includes a file system 519 having an inode counterpart on the local filesystem 517.

Right directional arrows of a first portion 501 of the first cluster 514 imply being directed from the application to the app node. Moreover, left directional arrows of the first portion 501 of the first cluster 514 imply being directed from the app node to the application. In one approach, each application node is configured to work on a respective directory and perform operations on the files inside the respective directory. Moreover, left directional arrows of a second portion 504 of the first cluster 514 imply being directed from the node to the filesystem. Moreover, right directional arrows of the second portion 504 of the first cluster 514 imply being directed from the filesystem to the node. Left directional arrows of the third portion 506 of the first cluster 514 imply being directed from the app node (on a same application path) to the gateway nodes (chosen based on hash). Right directional arrows of the third portion 506 of the first cluster 514 imply being directed from the gateway nodes back to the app node. Right directional arrows of a third portion 508 imply being directed from a respective gateway node to the corresponding NFS server node. Moreover, left directional arrows of the third portion 508 imply being directed from the respective NFS server node back to the corresponding gateway node. Assuming a good case configuration that each unique gateway node at the first cluster 514 is mapped to each unique NFS server at the second cluster 516, a result may include an efficient load balancing occurring when played over the wire. In one approach, because operations such as readdir, lookup and read may be synchronous in nature, the gateway node may begin playing it immediately from the queue.

On the first portion 521 of the second cluster 516, right directional arrows imply being directed from the NFS server node to the filesystem, and left directional arrows imply being directed from the filesystem back to the NFS server node.

Communications exchanged between the first cluster 514 and/or the second cluster 516 are described below. At a high level, these descriptions describe a queuing and execution model for readdir lookup and on demand reads on multiple uncached and incomplete directories from multiple application nodes in parallel.

In one approach, the queues of the gateway nodes may have entries included therein. For example, it may be assumed that the queue 524' includes one or more of a sync readdir on a first directory command, a sync lookup on a first directory and/or a first entry command, a sync lookup on a first directory and/or an Nth entry command, a sync read on a first directory and/or a first entry command, and a sync read on a first directory and/or an Nth entry command. Moreover, the queue 526' includes one or more of a sync readdir on an Nth directory command, a sync lookup on a first directory and/or a first entry command, a sync lookup on an Nth directory and/or an Nth entry command, a sync read on an Nth directory and/or a first entry command, and a sync read on an Nth directory and/or an Nth entry command. Moreover, the queue 528' includes one or more of a sync readdir on a second directory command, a sync lookup on the second directory and/or a first entry command, a sync lookup on the second directory and/or an Nth entry command, a sync read on a second directory and/or a first entry command, and a sync read on the second directory and/or an Nth entry command.

Operation 701(*a,b,c*) includes performing an iterative search-1 on the respective directories (Dir1, Dir2, DirN) at cache from the application nodes. This may trigger a complete readdir and a follow up lookup for each entry that is observed from the readdir. Subsequent to the readdir and lookup, each of the files are individually fetched to the cache from home, by performing an on-demand read on each file, but the respective application nodes.

Operation 702(*a,b,c*) includes triggering readdir on an uncached and incomplete directory (Dir1/Dir2/DirN) at cache.

Operation 703(*a,b,c*) includes returning that the directory is an uncached and incomplete directory (Dir1/Dir2/DirN) at cache.

Operation 704(*a*) includes observing that the directory (Dir1) is not cached and incomplete. In some approaches, the readdir (sync) operation may be queued and immediately played. Performing a hash on the inode of Dir1, may result in the request being assigned to the first gateway node.

Operation 704(*b*) includes observing that the directory (Dir2) is not cached and incomplete. In some approaches, the readdir (sync) operation may be queued and immediately played. Performing a hash on the inode of Dir2, may result in the request being assigned to the second gateway node.

Operation 704(*c*) includes observing that the directory (Dir3) is not cached and incomplete. In some approaches, the readdir (sync) operation may be queued and immediately played. Performing a hash on the inode of Dir3, may result in the request being assigned to the third gateway node.

Operation 705(*a*) includes playing the sync readdir operation on Dir1.

Operation 705(*b*) includes playing the sync readdir operation on Dir2.

Operation 705(*c*) includes playing the sync readdir operation on DirN.

Operation 706(*a*) includes performing a readdir on Dir1 to list all entries.

Operation 706(*b*) includes performing a readdir on Dir2 to list all entries.

Operation 706(*c*) includes performing a readdir on DirN to list all entries.

Operation 707(*a*) includes returning entries in the given directory.

Operation 707(*b*) includes returning entries in the given directory.

Operation 707(*c*) includes returning entries in the given directory.

Operation 708(*a*)(*i*) includes acknowledging the readdir operation and sending frame 1 of readdir contents to the gateway node.

Operation 708(*a*)(*ii*) includes sending frame 2 of readdir contents to the gateway node.

Operation 708(*a*)(N) includes sending frame N of readdir contents to the gateway node.

Operation 708(*b*)(*i*) includes acknowledging the readdir operation and sending frame 1 of readdir contents to the gateway node.

Operation 708(*b*)(*ii*) includes sending frame 2 of readdir contents to the gateway node.

Operation 708(*b*)(N) includes sending frame N of readdir contents to the gateway node.

Operation 708(*c*)(*i*) includes acknowledging the readdir operation and sending frame 1 of readdir contents to the gateway node.

Operation 708(*c*)(*ii*) includes sending frame 2 of readdir contents to the gateway node.

Operation 708(*c*)(N) includes sending frame N of readdir contents to the gateway node.

Operation 709(*a*)(*i*) includes sending frame 1 of readdir contents on all directories, received from the NFS server, to the application nodes.

Operation 709(*a*)(*ii*) includes sending frame 2 of readdir contents on all directories, received from the NFS server, to the application nodes.

Operation 709(*a*)(N) includes sending frame N of readdir contents on all directories, received from the NFS server, to the application nodes.

Operation 709(*b*)(*i*) includes sending frame 1 of readdir contents on all directories, received from the NFS server, to the application nodes.

Operation 709(*b*)(*ii*) includes sending frame 2 of readdir contents on all directories, received from the NFS server, to the application nodes.

Operation 709(*b*)(N) includes sending frame N of readdir contents on all directories, received from the NFS server, to the application nodes.

Operation 709(*c*)(*i*) includes sending frame 1 of readdir contents on all directories, received from the NFS server, to the application nodes.

Operation 709(*c*)(*ii*) includes sending frame 2 of readdir contents on all directories, received from the NFS server, to the application nodes.

Operation 709(*c*)(N) includes sending frame N of readdir contents on all directories, received from the NFS server, to the application nodes.

Operation 710(*a,b,c*) includes returning results of readdir on respective directories to the respective application(s).

Operation 711(*a,b,c*) includes putting the results of readdir (Dir1/Dir2/DirN) on disk and marking the directory as cached and completing the directory at cache. In one approach, all the entries on the directory may be orphans, and there may be no attributes about any of the entries on the cache.

Operation 712(*a,b,c*) includes triggering lookup(s) on Dir1/Entry1, Dir2/Entry1, DirN/Entry1 received on readdir of directories from the respective application nodes.

Operation 713(*a,b,c*) includes triggering a lookup on Dir1/Entry1, Dir2/Entry1, DirN/Entry1 received on readdir of directories at cache.

Operation 714(*a,b,c*) includes returning that Entry1 (on Dir1, Dir2, DirN, etc.) are orphans at cache.

Operation 715(*a*) includes observing that Dir1/Entry1 is an orphan entry, and triggering a sync remote lookup on Dir1/Entry1. The hash on inode of Dir1/Entry1 targets this inode operation to the first gateway node.

Operation 715(*b*) includes observing that Dir2/Entry1 is an orphan entry, and triggering a sync remote lookup on Dir2/Entry1. The hash on inode of Dir1/Entry1 targets this inode operation to the second gateway node.

Operation 715(b) includes observing that DirN/Entry1 is an orphan entry, and triggering a sync remote lookup on Dir2/Entry1. The hash on inode of DirN/Entry1 targets this inode operation to the third gateway node.

Operation 716(a) includes playing that the sync lookup operation on Dir1/Entry1.

Operation 716(b) includes playing that the sync lookup operation on Dir2/Entry1.

Operation 716(c) includes playing that the sync lookup operation on DirN/Entry1.

Operation 717(a) includes performing a lookup for attributes on Dir1/Entry1.

Operation 717(b) includes performing a lookup for attributes on Dir2/Entry1.

Operation 717(c) includes performing a lookup for attributes on DirN/Entry1.

Operation 718(a) includes returning attributes on Dir1/Entry1.

Operation 718(b) includes returning attributes on Dir2/Entry1.

Operation 718(c) includes returning attributes on DirN/Entry1.

Operation 719(a) includes returning the results of the lookup on Dir1/Entry1.

Operation 719(b) includes returning results of the lookup on Dir2/Entry1.

Operation 719(c) includes returning results of the lookup on DirN/Entry1.

Operation 720(a) includes returning a lookup on Dir1/Entry1 to the application node.

Operation 721(a,b,c) includes returning results of a lookup performed on Dir1/Entry1, Dir2/Entry1, DirN/Entry1 to the respective application(s) on the corresponding application nodes.

Operation 722(a,b,c) includes putting attributes of Dir1/Entry1, Dir2/Entry1, DirN/Entry1 to disk. Attributes are now present locally, but not actual data.

Operation 723(a,b,c) includes triggering lookup(s) on Dir1/EntryN, Dir2/EntryN, DirN/EntryN received on readdir of directories from the respective application nodes.

Operation 724(a,b,c) includes triggering lookup on Dir1/EntryN, Dir2/EntryN, DirN/EntryN received on readdir of directories at cache.

Operation 725(a,b,c) includes returning that EntryN (on Dir1, Dir 2, DirN, etc.) are orphans at cache.

Operation 726(a) through the first gateway node includes observing that Dir1/EntryN is an orphan entry, and triggering a sync remote lookup on Dir1/Entry1. The hash on inode of Dir1/EntryN targets this inode operation to the first gateway node.

Operation 726(a) through the second gateway node includes observing that Dir2/EntryN is an orphan entry, and triggering a sync remote lookup on Dir2/Entry1. The hash on inode of Dir2/EntryN targets this inode operation to the second gateway node.

Operation 726(a) through the third gateway node includes observing that DirN/EntryN is an orphan entry, and triggering a sync remote lookup on DirN/Entry1. The hash on inode of DirN/EntryN targets this inode operation to the third gateway node.

Operation 727(a) includes playing the sync lookup operation on Dir1/EntryN.

Operation 727(b) includes playing the sync lookup operation on Dir2/EntryN.

Operation 727(c) includes playing the sync lookup operation on DirN/EntryN.

Operation 728(a) includes performing a lookup for attributes on Dir1/EntryN.

Operation 728(b) includes performing a lookup for attributes on Dir2/EntryN.

Operation 728(c) includes performing a lookup for attributes on DirN/EntryN.

Operation 729(a) includes returning attributes on Dir1/EntryN.

Operation 729(b) includes returning attributes on Dir2/EntryN.

Operation 729(c) includes returning attributes on DirN/EntryN.

Operation 730(a) includes returning the results of the lookup on Dir1/EntryN.

Operation 730(b) includes returning the results of the lookup on Dir2/EntryN.

Operation 730(c) includes returning the results of the lookup on DirN/EntryN.

Operation 731(a) includes returning a lookup on Dir1/EntryN to the application node.

Operation 731(a) includes returning a lookup on Dir2/EntryN to the application node.

Operation 731(a) includes returning a lookup on DirN/EntryN to the application node.

Operation 732(a,b,c) includes returning results of the lookup on Dir1/EntryN, Dir2/EntryN, DirN/EntryN to the respective application(s) on the corresponding application nodes.

Operation 733(a,b,c) includes putting attributes of Dir1/EntryN, Dir2/EntryN, DirN/EntryN to disk. Attributes are now present locally, but not actual data.

Operation 734(a,b,c) includes triggering read(s) on Dir1/Entry1, Dir2/Entry1, DirN/Entry1 from the respective application nodes.

Operation 735(a,b,c) includes triggering read(s) on Dir1/Entry1, Dir2/Entry1, DirN/Entry1.

Operation 736(a,b,c) includes returning that entries Dir1/Entry1, Dir2/Entry1, DirN/Entry1 are uncached to the respective application nodes.

Operation 737(a) includes observing that the Dir1/Entry1 is uncached and triggering a sync remote on read Entry1.

Operation 737(a) includes observing that the Dir2/Entry1 is uncached and triggering a sync remote on read Entry1.

Operation 737(a) includes observing that the DirN/Entry1 is uncached and triggering a sync remote on read Entry1.

Operation 738(a) includes playing the sync read operation on Dir1/Entry1.

Operation 738(b) includes playing the sync read operation on Dir2/Entry1.

Operation 738(c) includes playing the sync read operation on DirN/Entry1.

Operation 739(a) includes reading data on Dir1/Entry1.

Operation 739(b) includes reading data on Dir2/Entry1.

Operation 739(c) includes reading data on DirN/Entry1.

Operation 740(c) includes returning data on DirN/Entry1.

Operation 740(a) includes returning data on Dir1/Entry1.

Operation 740(b) includes returning data on Dir2/Entry1.

Operation 741(a) includes returning data from read on Dir1/Entry1.

Operation 741(b) includes returning data from read on Dir2/Entry1.

Operation 741(c) includes returning data from read on DirN/Entry1.

Operation 742(a) includes returning data on Dir1/Entry1 to the application node.

Operation 742(a) includes returning data on Dir2/Entry1 to the application node.

Operation 742(a) includes returning data on DirN/Entry1 to the application node.

Operation 743(a,b,c) includes returning data from remote reads on Dir1/Entry1, Dir2/Entry1, DirN/Entry1 to the respective application(s) on the corresponding application nodes.

Operation 744(a,b,c) includes putting data Dir1/Entry1, Dir2/Entry1, DirN/Entry1 to disk. Data and attributes are now present locally.

Operation 745(a,b,c) includes triggering read(s) on Dir1/EntryN, Dir2/EntryN, DirN/EntryN from the respective application nodes.

Operation 746(a,b,c) includes triggering read(s) on Dir1/EntryN, Dir2/EntryN, DirN/EntryN.

Operation 747(a,b,c) includes returning that entries Dir1/EntryN, Dir2/EntryN, DirN/EntryN are all uncached to the respective application nodes.

Operation 748(a) includes observing that the Dir1/EntryN is uncached and triggering a sync remote read Entry1.

Operation 748(a) includes observing that the Dir2/EntryN is uncached and triggering a sync remote read Entry1.

Operation 748(a) includes observing that the DirN/EntryN is uncached and triggering a sync remote read Entry1.

Operation 749(a) includes playing the sync read operation on Dir1/EntryN.

Operation 749(b) includes playing the sync read operation on Dir2/EntryN.

Operation 749(c) includes playing the sync read operation on DirN/EntryN.

Operation 750(a) includes reading data on Dir1/EntryN.
Operation 750(b) includes reading data on Dir2/EntryN.
Operation 750(c) includes reading data on DirN/EntryN.
Operation 751(a) includes returning data on Dir1/EntryN.
Operation 751(b) includes returning data on Dir1/EntryN.
Operation 751(c) includes returning data on DirN/EntryN.
Operation 752(a) includes returning data from read on Dir1/EntryN.

Operation 752(b) includes returning data from read on Dir2/EntryN.

Operation 752(c) includes returning data from read on DirN/EntryN.

Operation 753(a) includes returning data on Dir1/EntryN to the application node.

Operation 753(a) includes returning data on Dir2/EntryN to the application node.

Operation 753(a) includes returning data on DirN/EntryN to the application node.

Operation 754(a,b,c) includes returning data from remote reads on Dir1/EntryN, Dir2/EntryN, DirN/EntryN to the respective application(s) on the corresponding application nodes.

Operation 755(a,b,c) includes putting data Dir1/EntryN, Dir2/EntryN, DirN/EntryN to disk. Data and attributes are now present locally.

In the above operations of FIG. 7, a hashing technique is applied on an inode number for synchronous/asynchronous operations. According to a specific approach, the hashing may be performed on the inode number against the number of gateway nodes in a cluster. Various examples of such operations include read, getattr, lookup, readdir operations, etc., on the file/object. As a result of the hashing, the operations are redirected to one a plurality of gateway nodes in the cluster, such that the given gateway node can fetch that particular entity's data from a second cluster, e.g., such as a remote cluster, and put to the local fileset/filesystem, e.g., see FIG. 7.

FIG. 8 depicts a clustered file system environment 800, in accordance with one embodiment. As an option, the present clustered file system environment 800 may be implemented in conjunction with features from any other embodiment listed herein, such as those described with reference to the other FIGS. Of course, however, such clustered file system environment 800 and others presented herein may be used in various applications and/or in permutations which may or may not be specifically described in the illustrative embodiments listed herein. Further, the clustered file system environment 800 presented herein may be used in any desired environment.

It should be noted that various components and/or communications of the clustered file system environment 800 of FIG. 8 may be similar to various components and/or communications of the clustered file system environment 700 of FIG. 7 the clustered file system environment 600 of FIG. 6 and/or the clustered file system environment 500 of FIG. 5. Accordingly, FIG. 5, FIG. 6, FIG. 7 and FIG. 8 may share some common numberings.

In FIG. 8, various communications exchanged between a first cluster 514, e.g., a cache site in the current example, and a second cluster 516, e.g., a home site in the current example, of the clustered file system environment 800 are illustrated in accordance with one embodiment. The first cluster 514 includes a plurality of clusters, e.g., see first application node 518, second application node 520, Nth application node 522, etc.

It may be assumed for purposes of an example that each of the application nodes have an application running. Moreover, in one approach, all operations triggered are triggered on-demand by the application running on app nodes, e.g., the first application node 518 through the Nth application node 522.

The first cluster 514 includes a single large fileset/filesystem 512. The single large fileset/filesystem 512 includes a plurality of local directory inodes, e.g., local Dir1 inode 507, local Dir2 inode 509, and local DirN inode 510, each having extended attributes (EAs) about a remote inode. The second cluster 516 includes a first NFS server node 511, a second NFS server node 513, and a third NFS server node 515. Moreover, the second cluster 516 includes a file system 519 having an inode counterpart on the local filesystem 517.

Right directional arrows of a first portion 501 of the first cluster 514 imply being directed from the application to the app node. Moreover, left directional arrows of the first portion 501 of the first cluster 514 imply being directed from the app node to the application. In one approach, each application node is configured to work on a respective directory and perform operations on the files inside the respective directory. Moreover, left directional arrows of a second portion 504 of the first cluster 514 imply being directed from the node to the filesystem. Moreover, right directional arrows of the second portion 504 of the first cluster 514 imply being directed from the filesystem to the node. Left directional arrows of the third portion 506 of the first cluster 514 imply being directed from the app node (on a same application path) to the gateway nodes (chosen based on hash). Right directional arrows of the third portion 506 of the first cluster 514 imply being directed from the gateway nodes back to the app node. Right directional arrows of a third portion 508 imply being directed from a respective gateway node to the corresponding NFS server node. Moreover, left directional arrows of the third portion 508 imply being directed from the respective NFS server node back to the corresponding gateway node. Assuming a good case configuration that each unique gateway node at the first cluster 514 is mapped to each unique NFS server at the second cluster 516, a result may include an efficient load balancing occurring when played over the wire. In one approach, because operations such as readdir, lookup and read may be synchronous in nature, the gateway node may begin playing it immediately from the queue.

On the first portion 521 of the second cluster 516, right directional arrows imply being directed from the NFS server node to the filesystem, and left directional arrows imply being directed from the filesystem back to the NFS server node.

Communications exchanged between the first cluster 514 and/or the second cluster 516 are described below. At a high level, these descriptions describe a queuing and execution model for readdir lookup and on demand reads on multiple uncached and incomplete directories from multiple application nodes in parallel.

In one approach, the queues of the gateway nodes may have entries included therein. For example, it may be assumed that the queue 524' includes one or more of a sync readdir on a first directory command, a sync lookup on a first directory and/or a first entry command, a sync lookup on a first directory and/or an Nth entry command, an async read on a first directory and/or a first entry command, and an async read on a first directory and/or an Nth entry command. Moreover, the queue 526' includes one or more of a sync readdir on a second directory command, a sync lookup on a second directory and/or a first entry command, a sync lookup on an second directory and/or an Nth entry command, an async read on a second directory and/or a first entry command, and an async read on a second directory and/or a first entry command. Moreover, the queue 528' includes one or more of a sync readdir on an Nth directory command, a sync lookup on the Nth directory and/or a first entry command, a sync lookup on the Nth directory and/or a first entry command, an async read on an Nth directory and/or an Nth entry command, and an async read on the Nth directory and/or an Nth entry command.

Operation 801 (a,b,c) includes performing an iterative search-1 on the respective directories (Dir1, Dir2, DirN) at cache from the application nodes. This may trigger a complete readdir and a follow up lookup for each entry that is observed from the readdir. Subsequent to the readdir and lookup, each of the files are individually fetched to the cache from home, by performing an on-demand read on each file, but the respective application nodes.

Operation 802(a,b,c) includes triggering readdir on an uncached and incomplete directory (Dir1/Dir2/DirN) at cache.

Operation 803(a,b,c) includes returning that the directory is an uncached and incomplete directory (Dir1/Dir2/DirN) at cache.

Operation 804(a) includes observing that the directory (Dir1) is not cached and incomplete. In some approaches, the readdir (sync) operation may be queued and immediately played. Performing a hash on the inode of Dir1, may result in the request being assigned to the first gateway node.

Operation 804(b) includes observing that the directory (Dir2) is not cached and incomplete. In some approaches, the readdir (sync) operation may be queued and immediately played. Performing a hash on the inode of Dir2, may result in the request being assigned to the second gateway node.

Operation 804(c) includes observing that the directory (Dir3) is not cached and incomplete. In some approaches, the readdir (sync) operation may be queued and immediately played. Performing a hash on the inode of Dir3, may result in the request being assigned to the third gateway node.

Operation 805(a) includes playing the sync readdir operation on Dir1.

Operation 805(b) includes playing the sync readdir operation on Dir2.

Operation 805(c) includes playing the sync readdir operation on DirN.

Operation 806(a) includes performing a readdir on Dir1 to list all entries.

Operation 806(b) includes performing a readdir on Dir2 to list all entries.

Operation 806(c) includes performing a readdir on DirN to list all entries.

Operation 807(a) includes returning entries in the given directory.

Operation 807(b) includes returning entries in the given directory.

Operation 807(c) includes returning entries in the given directory.

Operation 808(a)(i) includes acknowledging the readdir operation and sending frame 1 of readdir contents to the gateway node.

Operation 808(a)(ii) includes sending frame 2 of readdir contents to the gateway node.

Operation 808(a)(N) includes sending frame N of readdir contents to the gateway node.

Operation 808(b)(i) includes acknowledging the readdir operation and sending frame 1 of readdir contents to the gateway node.

Operation 808(b)(ii) includes sending frame 2 of readdir contents to the gateway node.

Operation 808(b)(N) includes sending frame N of readdir contents to the gateway node.

Operation 808(c)(i) includes acknowledging the readdir operation and sending frame 1 of readdir contents to the gateway node.

Operation 808(c)(ii) includes sending frame 2 of readdir contents to the gateway node.

Operation 808(c)(N) includes sending frame N of readdir contents to the gateway node.

Operation 809(a)(i) includes sending frame 1 of readdir contents on all directories, received from the NFS server, to the application nodes.

Operation 809(a)(ii) includes sending frame 2 of readdir contents on all directories, received from the NFS server, to the application nodes.

Operation 809(a)(N) includes sending frame N of readdir contents on all directories, received from the NFS server, to the application nodes.

Operation 809(b)(i) includes sending frame 1 of readdir contents on all directories, received from the NFS server, to the application nodes.

Operation 809(b)(ii) includes sending frame 2 of readdir contents on all directories, received from the NFS server, to the application nodes.

Operation 809(b)(N) includes sending frame N of readdir contents on all directories, received from the NFS server, to the application nodes.

Operation 809(c)(i) includes sending frame 1 of readdir contents on all directories, received from the NFS server, to the application nodes.

Operation 809(c)(ii) includes sending frame 2 of readdir contents on all directories, received from the NFS server, to the application nodes.

Operation 809(c)(N) includes sending frame N of readdir contents on all directories, received from the NFS server, to the application nodes.

Operation 810(a,b,c) includes returning results of readdir on respective directories to the respective application(s).

Operation 811(a,b,c) includes putting the results of readdir (Dir1/Dir2/DirN) on disk and marking the directory as cached and completing the directory at cache. In one approach, all the entries on the directory may be orphans, and there may be no attributes about any of the entries on the cache.

Operation 812(a,b,c) includes triggering lookup(s) on Dir1/Entry1, Dir2/Entry1, DirN/Entry1 received on readdir of directories from the respective application nodes.

Operation 813(a,b,c) includes triggering a lookup on Dir1/Entry1, Dir2/Entry1, DirN/Entry1 received on readdir of directories at cache.

Operation 814(a,b,c) includes returning that Entry1 (on Dir1, Dir 2, DirN, etc.) are orphans at cache.

Operation 815(a) includes observing that Dir1/Entry1 is an orphan entry, and triggering a sync remote lookup on Dir1/Entry1. The hash on inode of Dir1/Entry1 targets this inode operation to the first gateway node.

Operation 815(b) includes observing that Dir2/Entry1 is an orphan entry, and triggering a sync remote lookup on Dir2/Entry1. The hash on inode of Dir1/Entry1 targets this inode operation to the second gateway node.

Operation 815(b) includes observing that DirN/Entry1 is an orphan entry, and triggering a sync remote lookup on Dir2/Entry1. The hash on inode of DirN/Entry1 targets this inode operation to the third gateway node.

Operation 816(a) includes playing that the sync lookup operation on Dir1/Entry1.

Operation 816(b) includes playing that the sync lookup operation on Dir2/Entry1.

Operation 816(c) includes playing that the sync lookup operation on DirN/Entry1.

Operation 817(a) includes performing a lookup for attributes on Dir1/Entry1.

Operation 817(b) includes performing a lookup for attributes on Dir2/Entry1.

Operation 817(c) includes performing a lookup for attributes on DirN/Entry1.

Operation 818(a) includes returning attributes on Dir1/Entry1.

Operation 818(b) includes returning attributes on Dir2/Entry1.

Operation 818(c) includes returning attributes on DirN/Entry1.

Operation 819(a) includes returning the results of the lookup on Dir1/Entry1.

Operation 819(b) includes returning results of the lookup on Dir2/Entry1.

Operation 819(c) includes returning results of the lookup on DirN/Entry1.

Operation 820(a) includes returning a lookup on Dir1/Entry1 to the application node.

Operation 820(a) includes returning a lookup on Dir2/Entry1 to the application node.

Operation 820(a) includes returning a lookup on DirN/Entry1 to the application node.

Operation 821(a,b,c) includes returning results of a lookup performed on Dir1/Entry1, Dir2/Entry1, DirN/Entry1 to the respective application(s) on the corresponding application nodes.

Operation 822(a,b,c) includes putting attributes of Dir1/Entry1, Dir2/Entry1, DirN/Entry1 to disk. Attributes are now present locally, but not actual data.

Operation 823(a,b,c) includes triggering lookup(s) on Dir1/EntryN, Dir2/EntryN, DirN/EntryN received on readdir of directories from the respective application nodes.

Operation 824(a,b,c) includes triggering lookup on Dir1/EntryN, Dir2/EntryN, DirN/EntryN received on readdir of directories at cache.

Operation 825(a,b,c) includes returning that EntryN (on Dir1, Dir 2, DirN, etc.) are orphans at cache.

Operation 826(a) through the first gateway node includes observing that Dir1/EntryN is an orphan entry, and triggering a sync remote lookup on Dir1/Entry1. The hash on inode of Dir1/EntryN targets this inode operation to the first gateway node.

Operation 826(a) through the second gateway node includes observing that Dir2/EntryN is an orphan entry, and triggering a sync remote lookup on Dir2/Entry1. The hash on inode of Dir2/EntryN targets this inode operation to the second gateway node.

Operation 826(a) through the third gateway node includes observing that DirN/EntryN is an orphan entry, and triggering a sync remote lookup on DirN/Entry1. The hash on inode of DirN/EntryN targets this inode operation to the third gateway node.

Operation 827(a) includes playing the sync lookup operation on Dir1/entryN.

Operation 827(b) includes playing the sync lookup operation on Dir2/EntryN.

Operation 827(c) includes playing the sync lookup operation on DirN/EntryN.

Operation 828(a) includes performing a lookup for attributes on Dir1/EntryN.

Operation 828(b) includes performing a lookup for attributes on Dir2/EntryN.

Operation 828(c) includes performing a lookup for attributes on DirN/EntryN.

Operation 829(a) includes returning attributes on Dir1/EntryN.

Operation 829(b) includes returning attributes on Dir2/EntryN.

Operation 829(c) includes returning attributes on DirN/EntryN.

Operation 830(a) includes returning the results of the lookup on Dir1/entryN.

Operation 830(b) includes returning the results of the lookup on Dir2/EntryN.

Operation 830(c) includes returning the results of the lookup on DirN/EntryN.

Operation 831(a) includes returning a lookup on Dir1/EntryN to the application node.

Operation 831(a) includes returning a lookup on Dir2/EntryN to the application node.

Operation 831(a) includes returning a lookup on DirN/EntryN to the application node.

Operation 832(a,b,c) includes returning results of the lookup on Dir1/EntryN, Dir2/EntryN, DirN/EntryN to the respective application(s) on the corresponding application nodes.

Operation 833(a,b,c) includes putting attributes of Dir1/EntryN, Dir2/EntryN, DirN/EntryN to disk. Attributes are now present locally, but not actual data.

Operation 834(a,b,c)(i) includes triggering async read(s) on Dir1/Entry1, Dir2/Entry1, DirN/Entry1 from the respective application nodes directly to the gateway node.

Operation 834(a,b,c)(ii) includes triggering async read(s) on Dir1/Entry1, Dir2/Entry1, DirN/Entry1 from the respective application nodes directly to the gateway node.

Operation 835(a) includes queuing an async remote read on Dir1/Entry1.

Operation 835(b) includes queuing an async remote read on Dir2/Entry1.

Operation 835(c) includes queuing an async remote read on DirN/Entry1.

Operation 836(a) includes queuing an async remote read on Dir1/EntryN.

Operation 836(b) includes queuing an async remote read on Dir2/EntryN.

Operation 836(c) includes queuing an async remote read on DirN/EntryN.

Operation 838(a) includes playing that the sync read operation on Dir1/Entry1.

Operation 838(b) includes playing the async read operation on Dir2/Entry1.

Operation 838(c) includes playing the async read operation on DirN/Entry1.

Operation 839(a) includes reading data on Dir1/Entry1.

Operation 839(b) includes reading data on Dir2/Entry1.

Operation 839(c) includes reading data on DirN/Entry1.

Operation 840(a) includes returning data on Dir1/Entry1.

Operation 840(b) includes returning data on Dir2/Entry1.

Operation 840(c) includes returning data on DirN/Entry1.

Operation 841(a) includes returning data from read on Dir1/Entry1.

Operation 841(b) includes returning data from read on Dir2/Entry1.

Operation 841(c) includes returning data from read on DirN/Entry1.

Operation 849(a) includes playing the sync read operation on Dir1/EntryN.

Operation 849(b) includes playing the async read operation on Dir2/EntryN.

Operation 849(c) includes playing the async read operation on DirN/EntryN.

Operation 850(a) includes reading data on Dir1/EntryN.

Operation 850(b) includes reading data on Dir2/EntryN.

Operation 850(c) includes reading data on DirN/EntryN.

Operation 851(a) includes returning data on Dir1/EntryN.

Operation 851(b) includes returning data on Dir2/EntryN.

Operation 851(c) includes returning data on DirN/EntryN.

Operation 852(a) includes returning data from read on Dir1/EntryN.

Operation 852(b) includes returning data from read on Dir2/EntryN.

Operation 852(c) includes returning data from read on DirN/EntryN.

As described elsewhere herein, in some conventional network environments, multi gateway to a single NFS server models may result in bottlenecking. In sharp contrast, using the operations of FIG. 8 bottlenecking is avoided as each gateway is mapped to a unique NFS server. As a result, an efficient performance across all the gateway nodes is enabled. This is because workloads are in some approaches distributed based on inode numbers amongst all available gateway nodes. As a result, single gateway nodes do not experience bottlenecking, as there may be an even and/or balanced distribution of workload ensured across all provisioned gateway nodes. This may ensure a maximum utilization of gateway nodes in a parallel workload. There is moreover a relatively high availability of resources available when a gateway node fails, as the requests of the gateway node may be simply redistributed to another of the gateway nodes determined to have available resources. Data consistency is also enabled as a result of the relatively high availability of other gateway nodes being configured to accept such a redistributed workload. A relatively high availability of helper gateway nodes while processing the operations and redistributing requests across available helper nodes is also enabled as a result of using the techniques of embodiments and approaches described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, on a first cluster site, a first input/output (I/O) request to migrate a plurality of filesets from a second cluster site to the first cluster site, wherein the first cluster site includes a plurality of gateway nodes;
identifying at least two of the gateway nodes having resources available to perform operations of the migration;
hashing information of a plurality of filesets against the identified gateway nodes, wherein the information includes inode numbers of entities that are mounted during fulfillment of the first I/O request;
distributing operations of the first I/O request to the identified gateway nodes based on the hashing; and
instructing the identified gateway nodes to fulfill the operations.

2. The computer-implemented method of claim 1, wherein each of the inode numbers are evenly hashed to a unique one of the at least two identified gateway nodes during the hashing.

3. The computer-implemented method of claim 1, comprising:
maintaining a resource mapping that indicates resource availability in the gateway nodes.

4. The computer-implemented method of claim 1, comprising:
receiving indication that the hashing has resulted in a first of the identified gateway nodes being distributed more operations than resources of the first gateway node can fulfill;
determining at least one of the identified gateway nodes having resources available to perform at least some of the operations of the first gateway node; and
redistributing at least some of the operations from the first of the identified gateway nodes to the at least one of the identified gateway nodes determined to have resources available to perform at least some of the operations of the first gateway node.

5. The computer-implemented method of claim 4, wherein redistributing the at least some of the operations of the first gateway node to the at least one of the gateway nodes determined to have resources available to perform at least some of the operations of the first gateway node includes: hashing the inode numbers of the operations of the first gateway node against the gateway nodes determined to have resources available to perform at least some of the operations of the first gateway node.

6. The computer-implemented method of claim 1, comprising:
determining whether at least one of the identified gateway nodes has failed prior to fulfilling at least some of the operations of the first I/O request; and
in response to a determination that a first of the identified gateway nodes has failed, redistributing the unfulfilled operations to at least one of the other identified gateway nodes.

7. The computer-implemented method of claim 6, wherein the redistributing includes:
determining the inode numbers associated with the unfulfilled operations; and
hashing the inode numbers associated with the unfulfilled operations against a sub-plurality of the identified gateway nodes.

8. The computer-implemented method of claim 1, wherein at least three of the gateway nodes having resources available to perform operations of the migration are identified, wherein the hashing includes: hashing inode numbers of asynchronous type operations of the migration to a predetermined one of the identified of gateway nodes, and hashing inode numbers of synchronous type operations of the migration to at least two of the identified gateway nodes.

9. A computer program product, the computer program product comprising a computer readable storage medium having program instructions embodied therewith, the program instructions readable and/or executable by a controller to cause the controller to:
receive, by the controller, on a first cluster site, a first input/output (I/O) request to migrate a plurality of filesets from a second cluster site to the first cluster site, wherein the first cluster site includes a plurality of gateway nodes;
identify, by the controller, at least two of the gateway nodes having resources available to perform operations of the migration;
hash, by the controller, information of a plurality of filesets against the identified gateway nodes, wherein the information includes inode numbers of entities that are mounted during fulfillment of the first I/O request;
distribute, by the controller, operations of the first I/O request to the identified gateway nodes based on the hashing; and
instruct, by the controller, the identified gateway nodes to fulfill the operations.

10. The computer program product of claim 9, wherein the inode numbers are evenly hashed to a unique one of the identified gateway nodes during the hashing.

11. The computer program product of claim 9, the program instructions readable and/or executable by the controller to cause the controller to: maintain, by the controller, a resource mapping that indicates resource availability in the gateway nodes.

12. The computer program product of claim 9, the program instructions readable and/or executable by the controller to cause the controller to:
receive, by the controller, indication that the hashing has resulted in a first of the identified gateway nodes being distributed more operations than resources of the first gateway node can fulfill;
determine, by the controller, at least one of the identified gateway nodes having resources available to perform at least some of the operations of the first gateway node; and
redistribute, by the controller, at least some of the operations from the first of the identified gateway nodes to the at least one of the identified gateway nodes determined to have resources available to perform at least some of the operations of the first gateway node.

13. The computer program product of claim 12, wherein redistributing the at least some of the operations of the first gateway node to the at least one of the gateway nodes determined to have resources available to perform at least some of the operations of the first gateway node includes: hashing the inode numbers of the operations of the first gateway node against the gateway nodes determined to have resources available to perform at least some of the operations of the first gateway node.

14. The computer program product of claim 9, the program instructions readable and/or executable by the controller to cause the controller to:
determine, by the controller, whether at least one of the identified gateway nodes has failed prior to fulfilling at least some of the operations of the first I/O request; and
in response to a determination that a first of the identified gateway nodes has failed, redistribute, by the controller, the unfulfilled operations to at least one of the other identified gateway nodes.

15. The computer program product of claim 14, wherein the redistributing includes:
determining the inode numbers associated with the unfulfilled operations; and
hashing the inode numbers associated with the unfulfilled operations against a sub-plurality of the identified gateway nodes.

16. The computer program product of claim 9, wherein at least three of the gateway nodes having resources available to perform operations of the migration are identified, wherein the hashing includes: hashing inode numbers of asynchronous type operations of the migration to a predetermined one of the identified of gateway nodes, and hashing inode numbers of synchronous type operations of the migration to at least two of the identified gateway nodes.

17. A system, comprising:
a processor; and logic integrated with the processor, executable by the processor, or integrated with and executable by the processor, the logic being configured to:

receive, on a first cluster site, a first input/output (I/O) request to migrate a plurality of filesets from a second cluster site to the first cluster site, wherein the first cluster site includes a plurality of gateway nodes;

maintain a resource mapping that indicates resource availability in the gateway nodes;

identify at least two of the gateway nodes having resources available to perform operations of the migration;

hash information of a plurality of filesets against the identified gateway nodes, wherein the information includes inode numbers of entities that are mounted during fulfillment of the first I/O request;

distribute operations of the first I/O request to the identified gateway nodes based on the hashing; and instruct the identified gateway nodes to fulfill the operations.

18. The system of claim 17, wherein the inode numbers are evenly hashed to a unique one of the identified gateway nodes during the hashing.

19. The system of claim 17, the logic being configured to:

receive indication that the hashing has resulted in a first of the identified gateway nodes being distributed more operations than resources of the first gateway node can fulfill;

determine at least one of the identified gateway nodes having resources available to perform at least some of the operations of the first gateway node; and redistribute at least some of the operations from the first of the identified gateway nodes to the at least one of the identified gateway nodes determined to have resources available to perform at least some of the operations of the first gateway node.

* * * * *